United States Patent
Loi et al.

(10) Patent No.: US 10,868,479 B2
(45) Date of Patent: Dec. 15, 2020

(54) INVERSE ELECTROWETTING AND MAGNETIC ENERGY HARVESTING AND SCAVENGING METHODS, CIRCUITS AND SYSTEMS

(71) Applicant: STMicroelectronics S.r.l., Agrate Brianza (IT)

(72) Inventors: Sara Loi, Villaputzu (IT); Alberto Pagani, Nova Milanese (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 99 days.

(21) Appl. No.: 16/152,087

(22) Filed: Oct. 4, 2018

(65) Prior Publication Data

US 2020/0112270 A1     Apr. 9, 2020

(51) Int. Cl.
| H02N 1/08 | (2006.01) |
|---|---|
| H02N 1/06 | (2006.01) |
| H02N 2/18 | (2006.01) |

(52) U.S. Cl.
CPC ..................... *H02N 1/08* (2013.01)

(58) Field of Classification Search
CPC ............ H02N 1/08; H02N 1/06; H02N 1/006; H02N 1/004; H02N 11/002; H02N 2/186; H02N 2/18
See application file for complete search history.

(56) References Cited

U.S. PATENT DOCUMENTS

| 6,131,457 A | 10/2000 | Sato |
|---|---|---|
| 6,262,463 B1 | 7/2001 | Miu et al. |
| 6,404,192 B1 | 6/2002 | Chiesi et al. |

(Continued)

FOREIGN PATENT DOCUMENTS

| EP | 2930359 A1 * | 10/2015 | ............... H02N 1/04 |
|---|---|---|---|
| WO | 03/06575 A2 | 8/2003 | |

OTHER PUBLICATIONS

Beeby et al., "Energy harvesting vibration sources for microsystems applications," Institute of Physics Publishing, Meas. Sci. Technol. 17 (2006), R175-R195, published Oct. 26, 2006, 21 pages.
Kim et al., "Piezoelectric MEMS for energy harvesting," *MRS Bulletin* 37:1039-1050, Nov. 2012.
Krupenkin, Tom et al., "Reverse electrowetting as a new approach to high-power energy harvesting," Nature Communications, Aug. 23, 2011, DOI: 10.1038/ncomms1454, 8 pages.
Liu et al., "Dielectric materials for electrowetting-on-dielectric actuation,"*Microsyst Technol* 16:449-460, 2010.

(Continued)

*Primary Examiner* — Edgardo San Martin
(74) *Attorney, Agent, or Firm* — Seed IP Law Group LLP

(57) ABSTRACT

A harvesting and scavenging circuit includes an inverse electrowetting harvesting and scavenging circuit including a moveable mass with a moveable electrode that is moveable in three-dimensions relative to a second electrode having a first insulating layer covering a surface of the second electrode. A conductive fluid positioned between the first insulating layer and the moveable electrode. A magnetic energy harvesting and scavenging circuit includes at least one permanent magnetic segment on the movable mass and at least one energy harvesting and scavenging coil positioned proximate the moveable mass. Energy harvesting and scavenging circuitry is electrically coupled to the moveable electrode and the second electrode and is coupled to the at least one energy harvesting and scavenging coil. The energy harvesting and scavenging circuitry provides electrical energy generated through reverse electrowetting and magnetic energy stored in the at least one energy harvesting and scavenging coil.

20 Claims, 22 Drawing Sheets

(56) References Cited

U.S. PATENT DOCUMENTS

| | | |
|---|---|---|
| 6,911,132 B2 | 6/2005 | Pamula et al. |
| 7,501,302 B2 | 3/2009 | Kvisteroy |
| 7,886,595 B2 | 2/2011 | Fischer et al. |
| 7,898,096 B1 | 3/2011 | Krupenkin |
| 8,760,032 B2 * | 6/2014 | Despesse ............... H02N 1/08 310/309 |
| 9,242,851 B2 | 1/2016 | Geisberger et al. |
| 9,257,499 B2 * | 2/2016 | Pagani ............... H01L 23/5223 |
| 9,322,839 B2 * | 4/2016 | Ricotti ................. G01P 15/105 |
| 9,344,011 B2 * | 5/2016 | Abou-Nasr ........... B60C 23/041 |
| 9,701,325 B2 | 7/2017 | Kim et al. |
| 9,954,463 B2 * | 4/2018 | Kwon ..................... H02N 1/00 |
| 10,090,783 B2 * | 10/2018 | Kwon .................. H02N 11/002 |
| 10,250,163 B2 * | 4/2019 | Loi .......................... H02N 1/08 |
| 2009/0152990 A1 | 6/2009 | Brown et al. |
| 2010/0187835 A1 | 7/2010 | Hohlfeld et al. |
| 2010/0225255 A1 | 9/2010 | Franke |
| 2010/0295415 A1 | 11/2010 | Despesse et al. |
| 2011/0140458 A1 | 6/2011 | Arnold et al. |
| 2011/0140577 A1 | 6/2011 | Galchev et al. |
| 2011/0210722 A1 | 9/2011 | Paci et al. |
| 2013/0076202 A1 | 3/2013 | Naito et al. |
| 2013/0221799 A1 | 8/2013 | Nakatsuka et al. |
| 2013/0229087 A1 | 9/2013 | Hayashi et al. |
| 2013/0255381 A1 | 10/2013 | Ricotti et al. |
| 2013/0342032 A1 | 12/2013 | Laurent |
| 2014/0339954 A1 | 11/2014 | Yamakawa et al. |
| 2015/0061464 A1 | 3/2015 | Park et al. |
| 2015/0202656 A1 | 7/2015 | Takahashi et al. |
| 2015/0214861 A1 | 7/2015 | Denes |
| 2015/0340968 A1 | 11/2015 | Inaba et al. |
| 2015/0340970 A1 | 11/2015 | Kwon et al. |

OTHER PUBLICATIONS

Lueke et al., "MEMS-Based Power Generation Techniques for Implantable Biosensing Applications," Department of Mechanical Engineering, University of Alberta, Canada, *Sensors* 2011, 11, 1433-1460, published Jan. 26, 2011, 28 pages.

Mallick et al., "A nonlinear stretching based electromagnetic energy harvester on FR4 for wideband operation," *Smart Materials and Structures* 24:015013, 14 pages.

Mitcheson et al., "Performance limits of the three MEMS inertial energy generator transduction types," Journal of Micromechanics and Microengineering, 17 (2007) S211-S216, published Aug. 31, 2007, 6 pages.

Pérez-Rodriquez et al., "Electromagnetic Inertial Generator for Vibrational Energy Scavenging Compatible With Si Technology," The Fifth International Workshop on Micro and Nanotechnology for Power Generation and Energy Conversion Applications, PowerMEMS 2005, Nov. 28-30, 2005, Takeda Hall, The University of Tokyo, Tokyo, Japan, 4 pages.

Wang et al., "A Microelectroplated Magnetic Vibration Energy Scavenger for Wireless Sensor Microsystems," IEEE International Conference on Nano/Micro Engineered and Molecular Systems, Jan. 20-23, 2010, Xiamen, China, 4 pages.

Williams et al., Analysis of a Micro-Electric Generator for Microsystems, The 8th International Conference on Solid-State Sensors and Actuators, and Eurosensors IX, Stockholm, Sweden, Jun. 25-29, 1995, pp. 369-372.

Williams et al., Development of an Electromagnetic Micro-Generator, IEE Proc.-Circuits Devices Syst., vol. 148, No. 6, Dec. 2001, pp. 337-342.

* cited by examiner

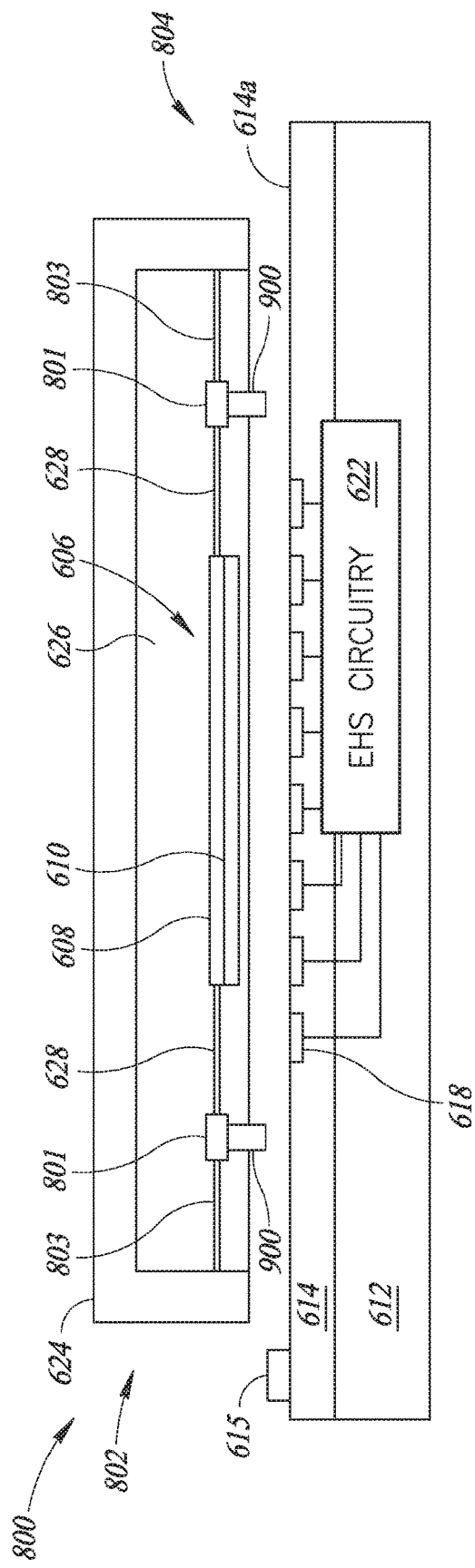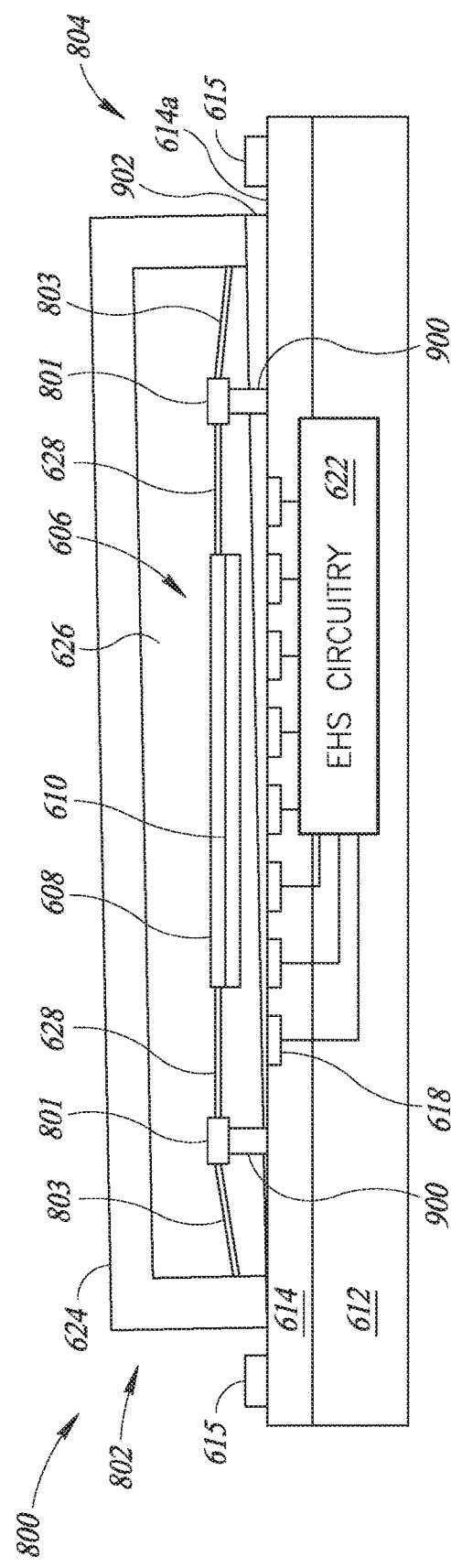

INVERSE ELECTROWETTING AND MAGNETIC ENERGY HARVESTING AND SCAVENGING METHODS, CIRCUITS AND SYSTEMS

BACKGROUND

Technical Field

The present disclosure relates to generally to energy harvesting and scavenging, and more specifically to inverse electrowetting structures and methods for energy harvesting and scavenging.

Description of the Related Art

Energy harvesting and energy scavenging are processes by which electrical energy is derived from an external power source, such as solar power, thermal energy, wind energy, or kinetic energy (motion or vibrations). This electrical energy is captured and stored for use to power an electronic device. The energy source for energy harvesting and scavenging is present as an ambient or background source of energy and is inherently present and thus free, in contrast to large scale electrical power generation where an input fuel like natural gas, oil, coal, or water is used in power generation. The two terms energy harvesting and energy scavenging are many times used interchangeably but are typically distinguished by the nature of the energy source. Energy harvesting is most accurately applied to situations where the external energy source is well known and regularly present, whereas energy scavenging applies where the external energy source is not well known and may be irregular or intermittently present.

Electrowetting may be defined as the utilization of an applied electric field to modify the wetting properties of a surface of a solid material, where wetting is the ability of a liquid to maintain contact with the surface due to molecular interactions when the liquid and solid surface are brought together. Reverse or inverse electrowetting is a process by which the interface between the liquid and solid surface is changed due to movement of the liquid relative to the surface, and these interface changes are utilized to generate electrical energy. The terms electrowetting and reverse or inverse electrowetting, along with the physical phenomenon associated with each of these terms, will be understood by those skilled in the art and thus will not be described in detail herein.

While the inverse electrowetting phenomenon will not be described in detail, to facilitate a better understanding of the present disclosure the inverse electrowetting process will now be briefly described. In the reverse electrowetting process, the liquid is a conductive liquid and the interface is formed between a droplet of the liquid and an electrode that forms the solid surface, with an intermediate insulating layer between the liquid and the electrode. Multiple droplets and interfaces between these droplets and one or more electrodes would actually be utilized but only the interface between a single droplet and electrode is discussed herein by way of example to describe the generation of electrical energy through inverse electrowetting. Air or other gas (or gases) can fill the device, between the liquid (or fluid) and the moveable electrode.

An electrical circuit provides a bias voltage between the droplet and the electrode. External mechanical or kinetic energy, typically in the form of movement of a user where the liquid and electrode are part of a structure contained in a portable electronic device, causes relative movement of the droplets over the surface of the electrode. This movement of the droplet results in a change in an overlap of the droplet with the surface of the electrode, which would typically be a dielectric-film-coated electrode. The change in overlap of the droplet and the surface of the electrode results in a decrease of a total charge that can be maintained at the liquid-solid (i.e., droplet-electrode) interface. As a result of this change in the total charge, extra electrical charge that can no longer be maintained at the droplet-electrode interface flows back through the electrical circuit that is connected to apply the bias voltage to the droplet and the electrode. This extra electrical charge flowing through the electrical circuit results in a current through the electrical circuit that can be used to power external electrical circuitry. In this way the inverse electrowetting process can be used in an energy harvesting and scavenging system.

Energy harvesting and scavenging are utilized to provide a very small amount of electrical energy that may be utilized to supply power to low-power electronic devices. The electronic device is typically a small, wireless device like those contained in portable electronic devices like smart phones or in wearable electronics such as a smart watch, an activity or fitness tracker, and so on. In such a wearable electronic device, a user wears the device and the mechanical or kinetic energy in the form of movement of the user may be harvested or scavenged to generate electrical energy. Inverse electrowetting may be utilized in such energy harvesting and scavenging systems but there is a need for improved techniques and structures that increase the amount of generated electrical energy from such inverse electrowetting systems.

BRIEF SUMMARY

One embodiment of the present disclosure is an inverse electrowetting harvesting and scavenging circuit that includes a first substrate having a first surface and a second surface. An electrode is formed proximate the first surface. An electromechanical systems device includes a moveable mass that extends over the first surface of the first substrate and may be displaced relative to the first substrate in three dimensions responsive to an external force applied to the moveable mass. The movable mass includes a moveable electrode and a conductive fluid or liquid positioned between the movable electrode and the other electrode, with the other electrode being coated with an insulating layer. Energy harvesting and scavenging circuitry is electrically coupled to the moveable electrode and the other electrode and is configured to provide electrical energy responsive to electrical energy generated by the moveable electrode, conductive fluid and the other electrode through the reverse electrowetting phenomena due to conductive fluid deformation caused by movement of the moveable electrode relative to the electrode. The electromechanical systems device may be a microelectromechanical systems (MEMS) device.

BRIEF DESCRIPTION OF THE SEVERAL VIEWS OF THE DRAWINGS

For a better understanding of the present disclosure, embodiments thereof are now described purely by way of non-limiting example, with reference to the attached drawings, wherein:

FIGS. 9A and 9B are cross-sectional views of the EHS device of FIG. 8 showing how springs coupled between the additional frame and the packaging structure along with vertical spacers (pillars) compensate for planarity errors between the moveable mass and the electrode plates of the first semiconductor chip;

DETAILED DESCRIPTION

Figure 1A:
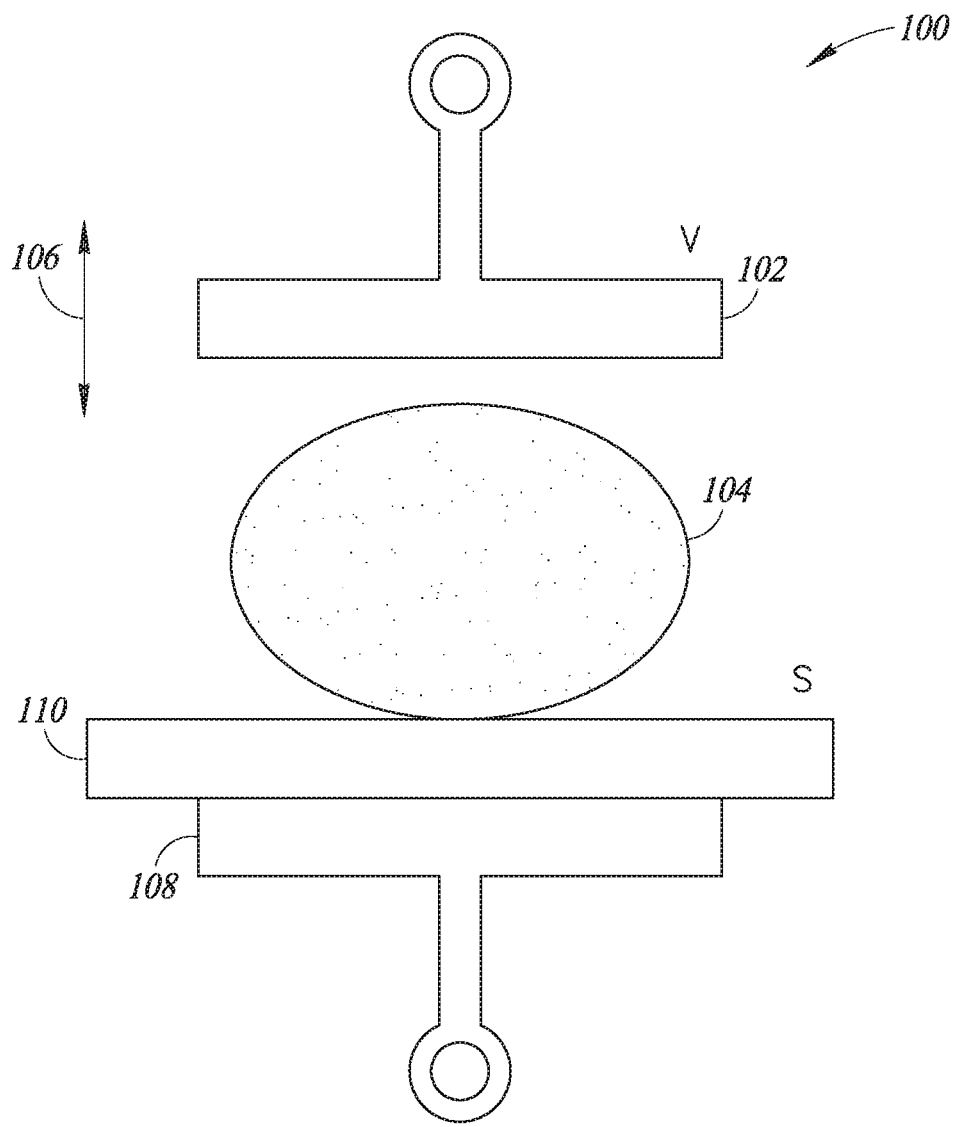
FIGS. 1A-1C are a simplified cross-sectional schematic diagrams of a reverse electrowetting energy harvesting and scavenging (EHS) device that includes at least one electrode that is moveable relative to a second electrode and a conductive liquid on top of the second electrode to generate electrical energy through the phenomena of reverse electrowetting according to embodiments of the present disclosure.
Figure 1B:
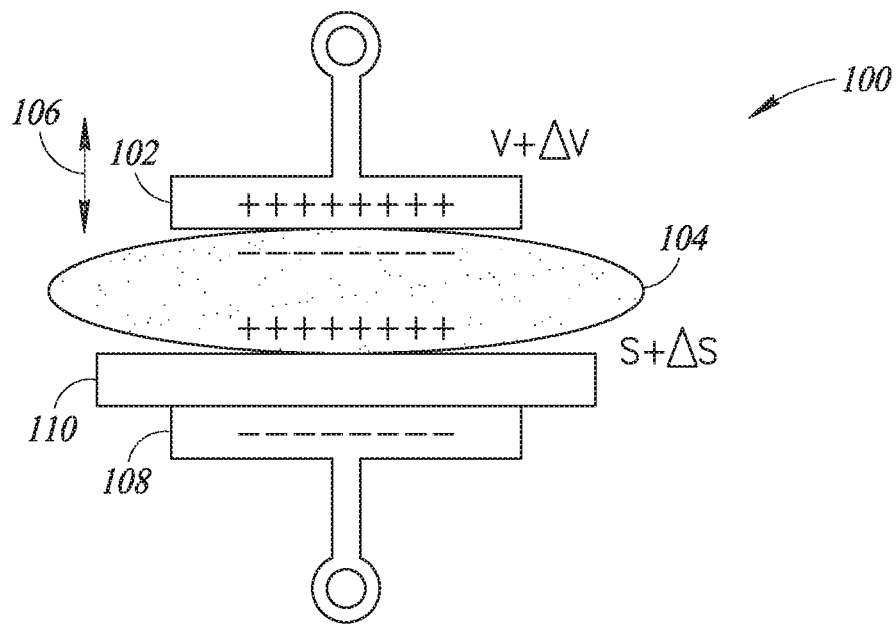
Figure 1C:
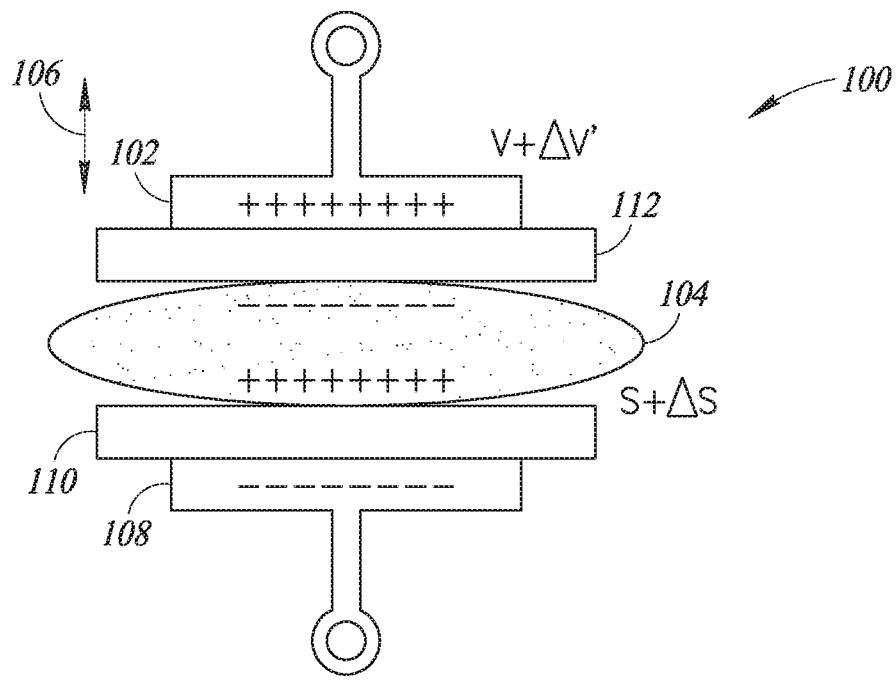

FIGS. 1A-1C are a simplified cross-sectional schematic diagrams of an inverse or reverse electrowetting energy harvesting and scavenging (EHS) device 100 that includes a moveable electrode 102 that is moveable relative to a second electrode and to a drop of a conductive fluid or liquid 104 on top of the second electrode to generate electrical energy through the phenomena of reverse electrowetting according to embodiments of the present disclosure. In operation, mechanical energy in the form of motion from an external source, such as from the movement of a person utilizing a portable electronic device containing the EHS device 100, causes movement of the moveable electrode 102 relative to the fixed conductive liquid 104. Most prior reverse electrowetting approaches utilize structures in which from the frame of reference of the electrodes the conductive liquid moves across the surfaces of the electrodes responsive to mechanical energy from an external source and the contact area of liquid and electrodes is changed due to relative motion. In contrast, in the EHS device 100 from the frame of reference of the moveable electrode 102 the moveable electrode moves in a vertical direction 106 as indicated by the arrow 106 responsive to mechanical energy from an external source and the contact area is changed due to a deformation of the liquid.

This approach to forming reverse electrowetting EHS devices or circuits enables the utilization of microelectromechanical systems (MEMS) structures containing moveable masses to form the moveable electrode 102 to enhance liquid deformation. In some embodiments, MEMS structures form the moveable electrode 102 that is movable in three-dimensions relative to the conductive liquid 104, as will be described in more detail below. Reverse electrowetting EHS devices including such structures can increase the amount of electrical energy that can be harvested and scavenged through such devices while also allowing conventional semiconductor fabrication methods to be utilized in forming the devices, as will also be discussed in more detail below.

In the present description, certain details are set forth in conjunction with the described embodiments to provide a sufficient understanding of the present disclosure. One skilled in the art will appreciate, however, that embodiments of the disclosure may be practiced without these particular details. Furthermore, one skilled in the art will appreciate that the present disclosure is not limited to the example embodiments described herein, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail below to avoid unnecessarily obscuring the present disclosure. Finally, components that are common among the described embodiments are given the same reference numbers or descriptors in the present application even though the detailed operation of such components may vary among embodiments.

Still referring to FIG. 1A, the reverse electrowetting EHS device 100 of FIG. 1A further includes an electrode 108 having a dielectric layer 110 formed on an upper surface of the electrode. The drop of conductive liquid 104 sits on the surface of the dielectric layer 110 and covers a surface area S on the surface of this dielectric layer. Mechanical energy from an external source, such as from the movement of a user of a portable electronic device containing the EHS device, causes movement of the moveable electrode 102, relative to the electrode 108, in the vertical direction 106 in this simplified example. This movement of the moveable electrode 102 relative to the electrode 108 results in a change in the surface area S of the conductive liquid 104 on the surface of the dielectric layer 110, as seen in FIG. 1B. Due to the downward movement of the electrode 102, the conductive liquid 104 now has a surface area (S+ΔS) on the surface of the dielectric layer 110. In the EHS device 100, the moveable electrode 102, conductive liquid 104, dielectric layer 110 and electrode 108 effectively functions as a variable capacitance device, with the capacitance being a function of the surface area of the conductive liquid 104 on the dielectric film 110. As a result of this change in capacitance, the voltage across the electrodes 102, 108 changes as well and the resulting current harvested or scavenged to generate electrical energy. The voltage is shown as being V in FIG. 1A and (V+ΔV) in FIG. 1B. FIG. 1C shows a structure where the EHS device 100 further includes a second dielectric layer 112 formed on the surface of the moveable electrode 102. This second dielectric layer 112 changes the effective capacitance and thus the voltage (V+ΔV') across the electrodes 102, 108 for the same surface area (S+ΔS) of the conductive liquid 104 on the surface of the dielectric layer 110.

Figure 2A:
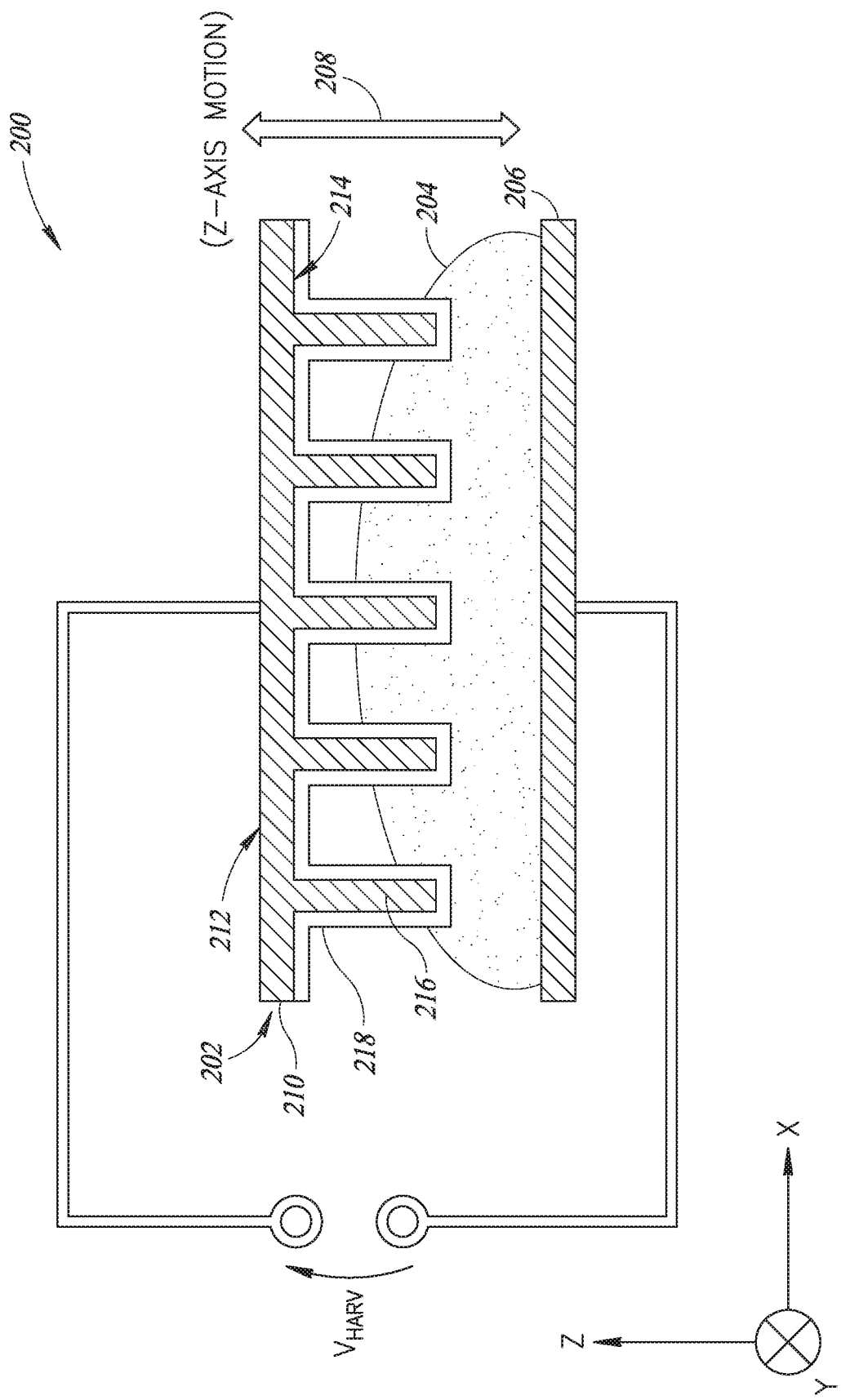
FIGS. 2A and 2B are cross-sectional schematic diagrams of an EHS device including an interdigitated or three-dimensional comb-like electrode and a second electrode that are moveable in three dimensions one relative to the other, with an intermediate conductive fluid on the interdigitated electrode according to one embodiment of the present disclosure.
Figure 2B:
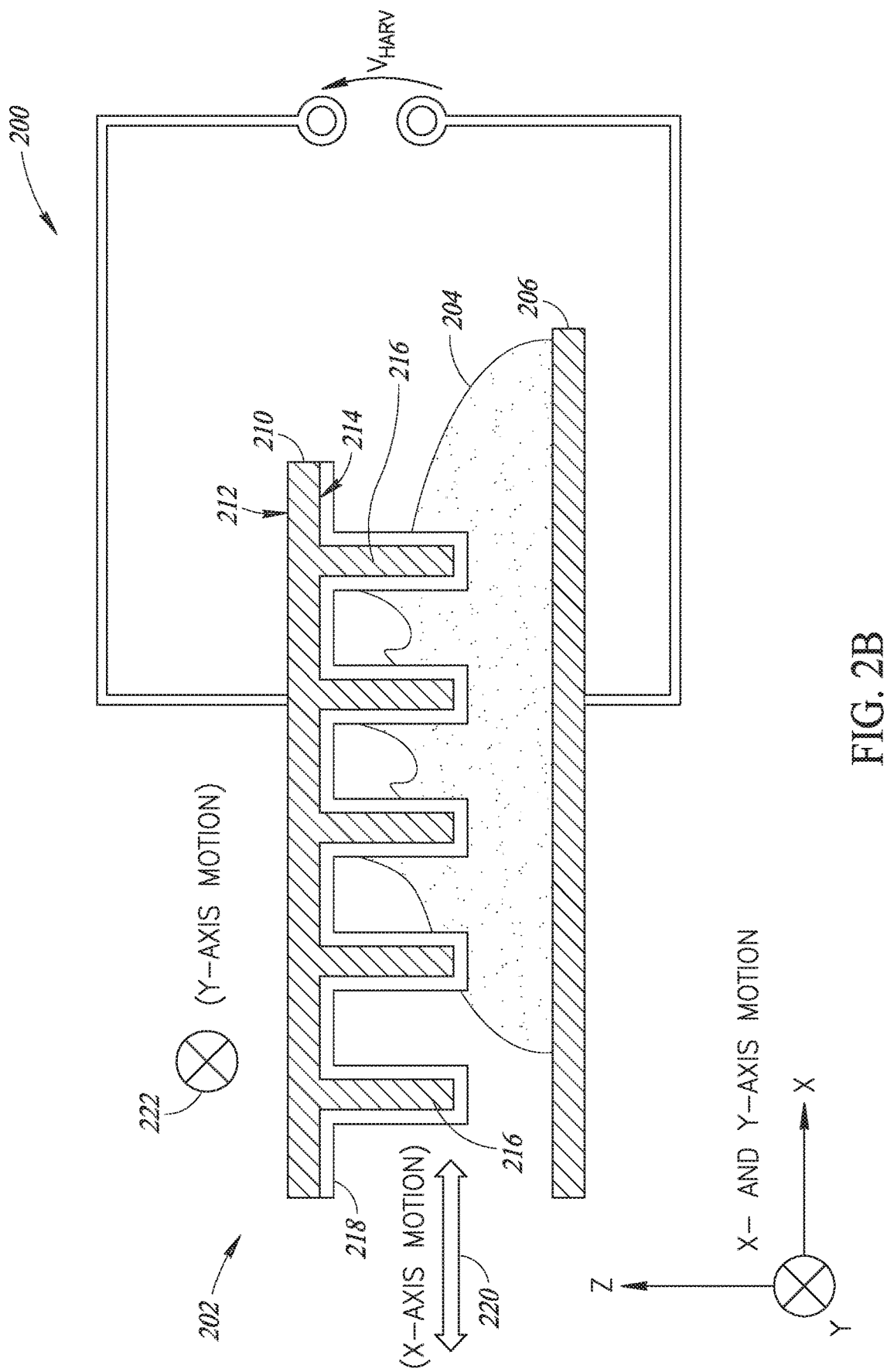

FIGS. 2A and 2B are cross-sectional schematic diagrams of a reverse electrowetting EHS device 200 including a three-dimensional comb-like electrode 202 and an electrode 206 that are moveable one with respect to the other in three dimensions. A conductive fluid 204 on the electrode 206 is in contact with the three-dimensional comb-like electrode according to one embodiment of the present disclosure. FIG. 2A illustrates movement of the electrode 202 relative to the electrode 206 along a Z-axis or in the Z direction as illustrated by arrow 208 relative to the conductive fluid 204 and the three-dimensional comb-like electrode 202. The three-dimensional comb-like electrode 202 includes a horizontal plate 210 having an upper surface 212 and a lower surface 214. A number of vertical projections 216 extend from the lower surface 214 of the horizontal plate 210 towards the electrode 206 and into the conductive fluid 204. Only five vertical projections 216 are shown in FIGS. 2A and 2B merely by way of example and to simply the figures, with embodiments of the electrode 202 including any suitable number of such vertical projections. Embodiments of the EHS device 200 may include a much larger or lower number of such vertical projections 216 formed along the X- and Y-axes 220, 222 on the lower surface 214 of the horizontal plate. A first dielectric film or layer 218 is formed over the lower surface 214 of the horizontal plate 210 and over the surfaces of the vertical projections 216. In another embodiment, a second dielectric layer (not shown) is formed over the upper surface of the electrode 206. FIG. 2B illustrates movement of the electrode 202 relative to the electrode 206 along the X-axis as illustrated by arrow 220 and along the Y-axis 222, which is into and out of the page in the figure. The same structure shown for the interdigitated electrode 202 in the X direction can be designed in the Y direction in a two-dimensional (2D) segmented structure (not shown in FIGS. 2A and 2B). The horizontal plate 210 and vertical projections 216 of the electrode 202 and the other electrode 206 are formed from a suitable material, such as Silicon with at least one metal electrode created on top (not shown).

In operation, a bias voltage source (not shown) supplies a DC bias voltage across the electrodes 202 and 206 while an electronic device containing the EHS device 200 receives mechanical energy in the form of motion from an external source, such as in the form of movement of a person utilizing the portable electronic device. This mechanical energy results in the electrode 202 moving relative to the conductive fluid 204 and the electrode 206. This is illustrated in FIG. 2A with the conductive liquid 204 having the illustrated shape and overlap with the interdigitated electrode 202 moving relative to the electrode 206 in the Z-direction 208, while in FIG. 2B the conductive liquid has the illustrated shape due to movement of the electrode 202 relative to electrode 206 in the X- and Y-directions 220, 222. This change in area or overlap is seen between FIGS. 2A and 2B. For example, the conductive liquid 204 overlaps or covers a portion of the surface of the far left vertical projection 216 in FIG. 2A and does not overlap this vertical projection in FIG. 2B. The change in overlap of the conductive liquid 204 with the four remaining vertical projections 216 to the right is seen between FIGS. 2A and 2B as well. This change in area or overlap of the conductive liquid 204 on the surface of the dielectric layer 218 results in a change in capacitance of the EHS device 200 and a resulting flow of charge that generates a harvested and scavenged voltage VHARV across the electrodes 202, 206 through the reverse electrowetting phenomena as described above. The generated VHARV voltage may then be utilized to power circuitry (not shown) of the electronic device containing the EHS device 200.

Figure 3A:
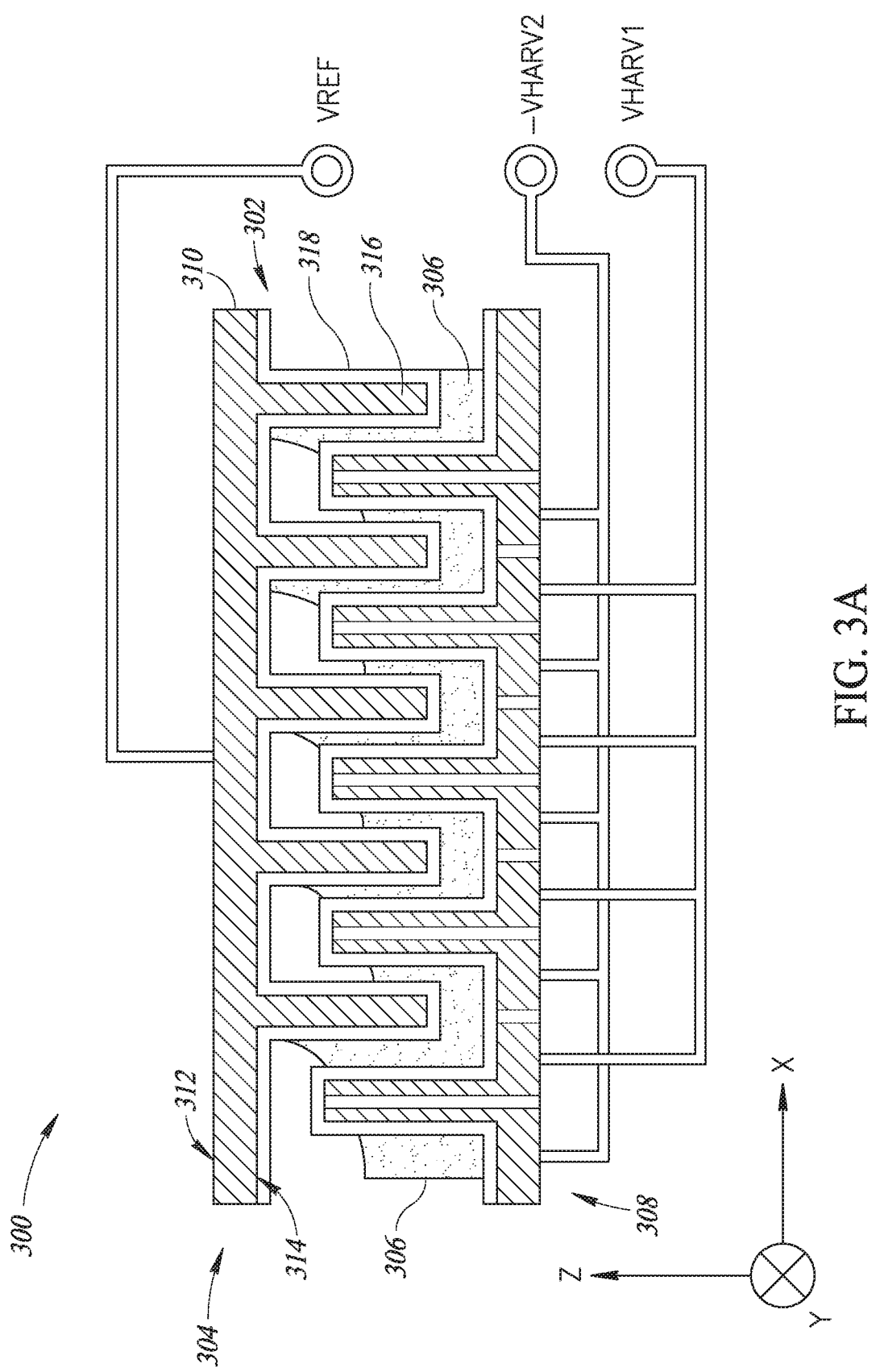
FIG. 3A is a cross-sectional schematic diagram of an EHS device including an interdigitated electrode structure for generating dual voltages relative to a common reference node according to another embodiment of the present disclosure.

FIG. 3A is a cross-sectional schematic diagram of an EHS device 300 including an interdigitated electrode structure 302 for generating dual voltages VHARV1, −VHARV2 relative to a voltage reference node VREF according to another embodiment of the present disclosure. The interdigitated electrode structure 302 includes a three-dimensional comb-like movable electrode 304 that is moveable in three dimensions relative to a conductive fluid 306 on a segmented electrode 308 according to one embodiment of the present disclosure. The three-dimensional comb-like movable electrode 304 is moveable along X-, Y- and Z-axes as shown in the lower left of the figure and has a structure that is the same as or similar to the electrode 202 of FIGS. 2A and 2B in the embodiment of FIG. 3A. Accordingly, the movable electrode 304 includes a horizontal plate 310 having an upper surface 312 and a lower surface 314. A number of vertical projections 316 extend from the lower surface 314 and the lower surface and vertical projections are covered by a first dielectric layer 318.

The vertical projections 316 extend into the conductive fluid 306 and towards the segmented electrode 308. The segmented electrode 308 includes a plurality of electrode segments 320, one of which is shown in and will be described in more detail with reference to FIGS. 3A and 3B. Each electrode segment 320 includes a vertical projection portion 322 that extends upward towards the moveable electrode 304 as seen in FIG. 3A. The vertical projection portions 322 are interdigitated with the vertical projections 316 of the moveable electrode 304. Thus, each vertical projection portion 322 is positioned between adjacent vertical projections 316 of the moveable electrode 304. Each vertical projection 322 is formed by first and second L-shaped electrodes 324 and 326 with a vertical dielectric layer 328 positioned between the vertical-portions of the L-shaped electrodes to electrically isolate the two L-shaped electrodes. A second dielectric layer 330 is formed over an upper surface of each electrode segment 320, and is thus formed over upper surfaces of the L-shaped electrodes and an upper edge surface of the vertical dielectric layer 328. On the ends of each of the horizontal portions of each L-shaped electrode 324, 326 a vertical dielectric layer 332 is formed to electrically isolate each of the L-shaped electrodes from the L-shaped electrode (not shown in FIG. 3B) of the adjacent electrode segment 320.

In operation, responsive to movement of the moveable electrode 304 in three dimensions along the X-, Y- and Z-axes relative to the conductive fluid 306 on the electrode segments 320, the EHS device 300 generates the first dual voltage VHARV1 on the L-shaped electrodes 324 and the second dual voltage −VHARV2 on the L-shaped electrodes 326. Note that in this embodiment, the voltage −VHARV2 is negative relative to the voltage on the reference voltage node VREF while the voltage VHARV is positive relative to the voltage on the reference voltage node. The reference voltage node VREF is coupled to ground GND in one embodiment of the EHS device 300.

Figure 3B:
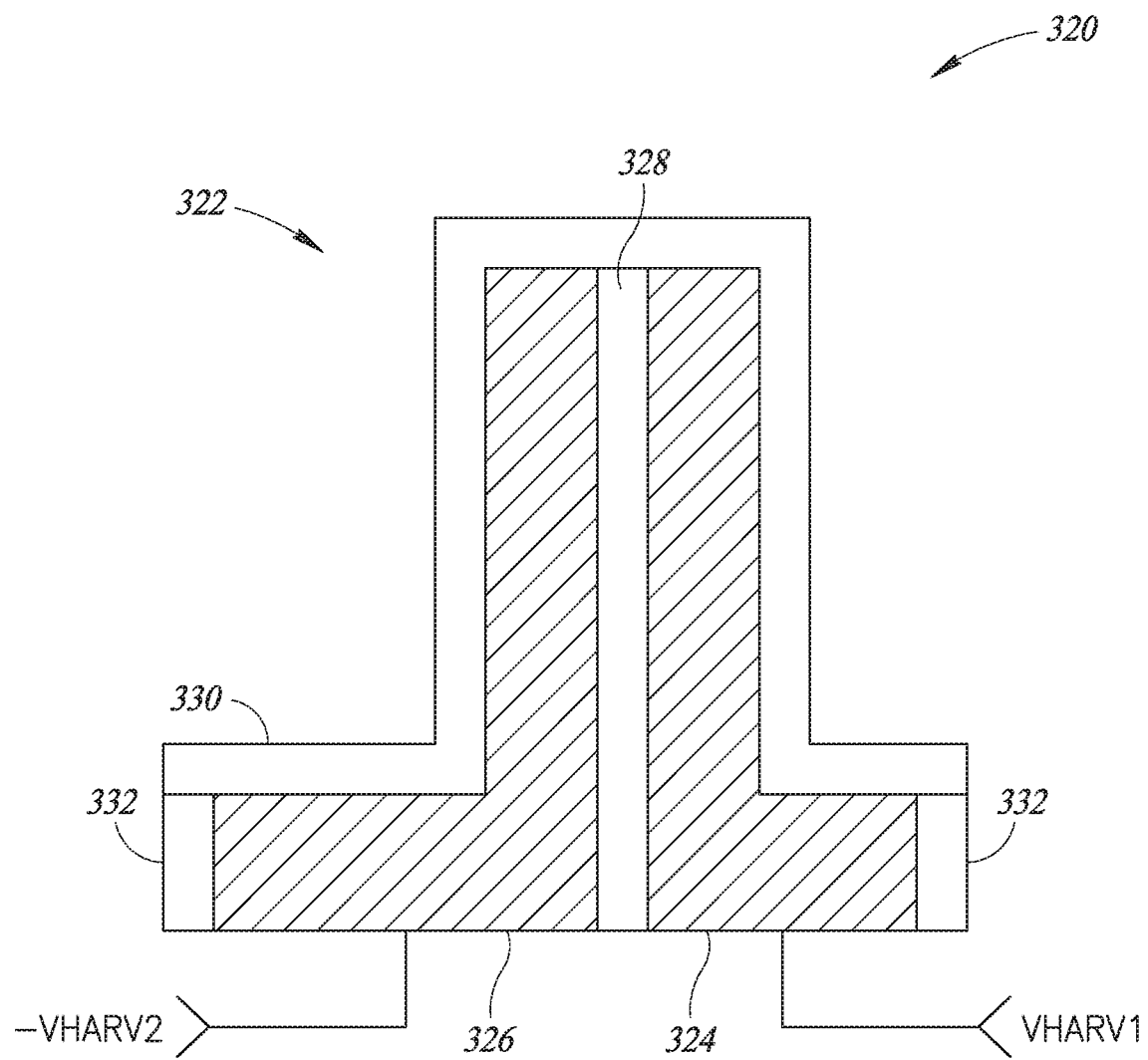
FIG. 3B is a cross-sectional schematic diagram illustrating in more detail one of the electrode segments of FIG. 3A.
Figure 4:
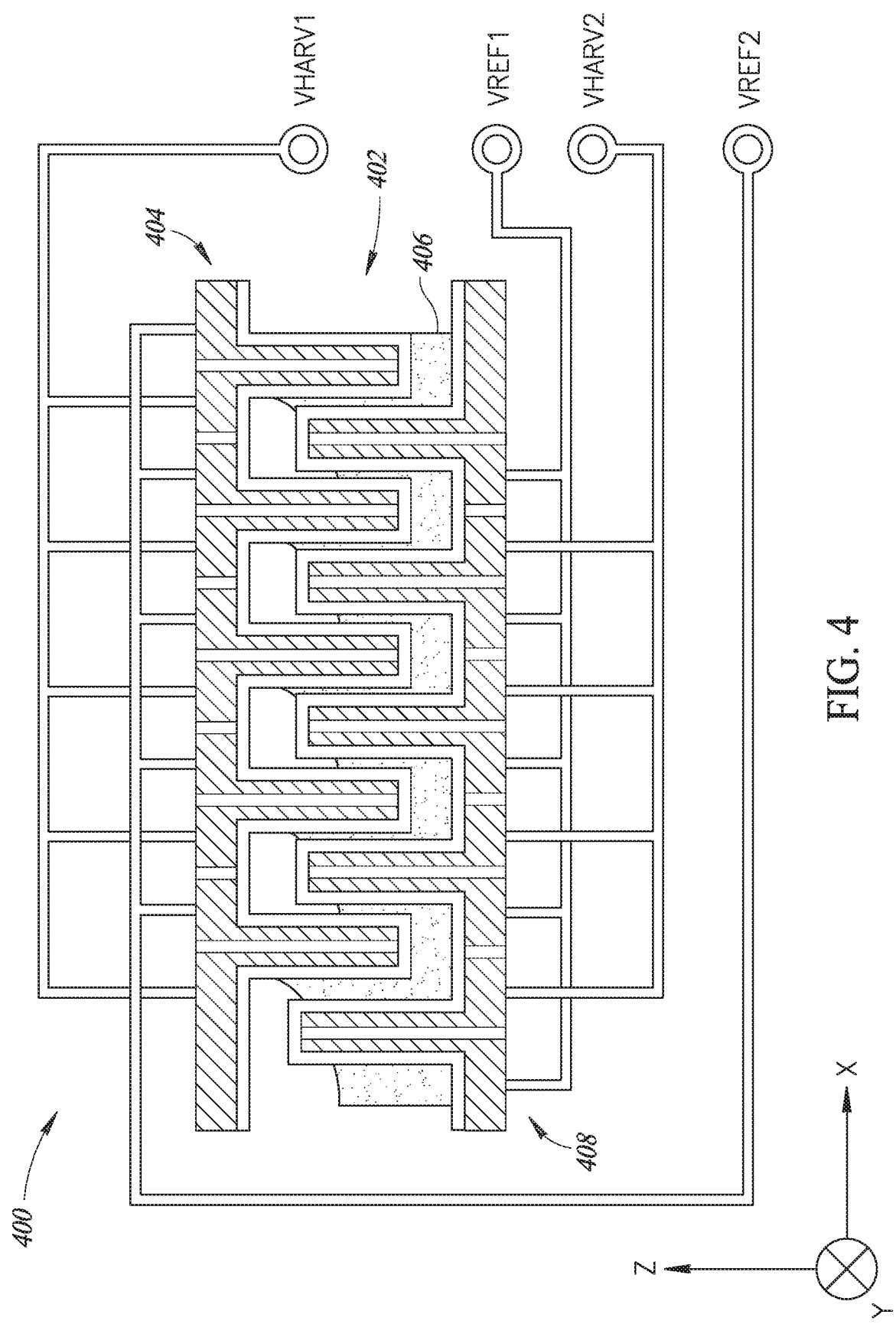
FIG. 4 is a cross-sectional schematic diagram of an EHS device including another interdigitated electrode structure for generating dual voltages, each voltage having an independent reference node according to yet another embodiment of the present disclosure.

FIG. 4 is a cross-sectional schematic diagram of an EHS device 400 including another interdigitated electrode structure 402 for generating dual isolated voltages VHARV1, VHARV2 according to yet another embodiment of the present disclosure. Each voltage VHARV1, VHARV2 is isolated in that each voltage has an independent voltage reference node VREF1, VREF2 instead of the common reference voltage node VREF as in the EHS device 300 of FIGS. 3A and 3B. In the EHS device 400 components 406-432 correspond to the components 306-332 previously described with reference to FIGS. 3A and 3B and thus will not again be described in detail with reference to FIG. 4.

The difference between the EHS device 400 and the EHS device 300 of FIGS. 3A and 3B is that the EHS device 400 includes a moveable electrode 404 that also has a segmented structure as described for the segmented electrode 308 of FIGS. 3A and 3B. Thus, in the EHS device 400 both the moveable electrode 404 and the electrode 408 have a segmented structure. In the embodiment of FIG. 4, the structure of each of the moveable electrode 404 and the electrode 408 has the same segmented structure as for the electrode 308 of FIGS. 3A and 3B. Thus, each of the electrode segments for the electrodes 404 and 408 has the same structure as the electrode segment 320 shown in FIG. 3B. Other embodiments of the EHS device 400 include different segmented electrode structures for one or both the electrodes 404 and 408. In operation, responsive to movement of the moveable electrode 404 in three dimensions along the X-, Y- and Z-axes relative to the conductive fluid 406 on the electrode 408, the EHS device 400 generates a first isolated voltage VHARV1 relative to the first reference voltage node VREF1 and a second isolated voltage VHARV2 relative to the second reference voltage node VREF2. Voltage signals VHARV1 and VHARV2, for example, may be managed independently to improve the generation efficiency.

Figure 5:
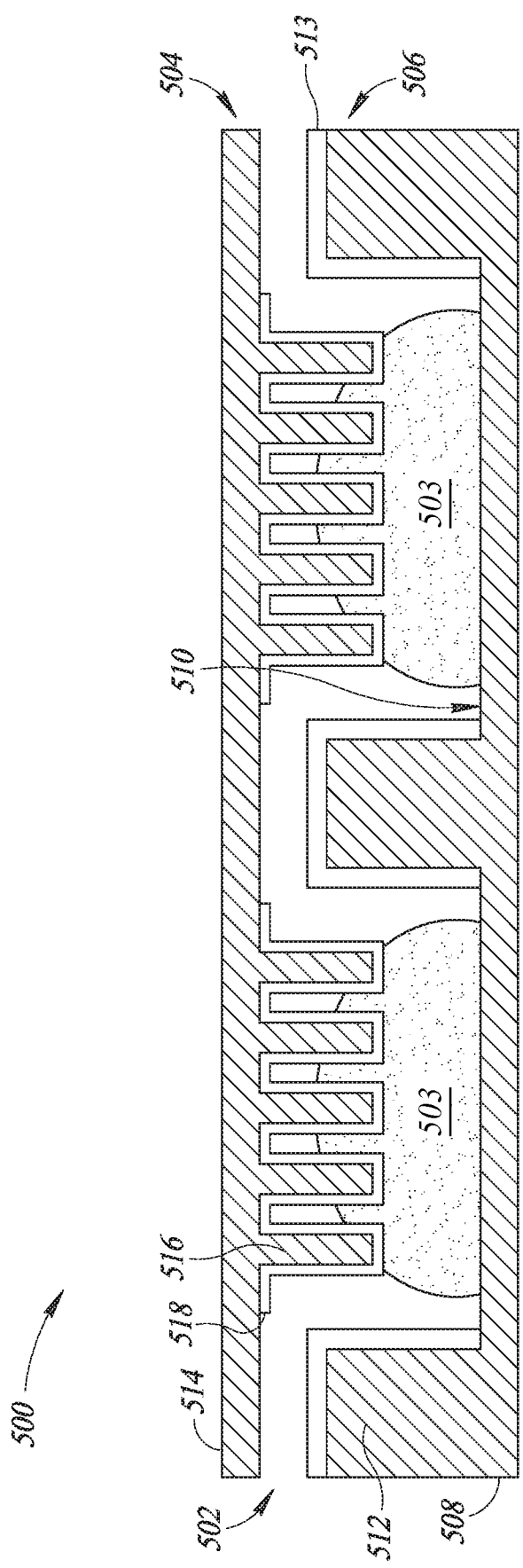
FIG. 5 is a cross-sectional schematic diagram of an EHS device including yet another electrode structure having vertical projections on a lower one of the electrodes that function both as stoppers and to confine conductive fluid on this lower electrode between adjacent vertical projections according to a still further embodiment of the present disclosure.

FIG. 5 is a cross-sectional schematic diagram of an EHS device 500 including yet another electrode structure 502 having vertical projections on a lower one of the electrodes that function to confine conductive fluid 503 on this lower electrode between adjacent vertical projections according to a still further embodiment of the present disclosure. The electrode structure 502 includes an electrode 504 having a structure similar to the structure of the electrode 202 of FIGS. 2A and 2B. The electrode structure 502 further includes an electrode 506 having a horizontal plate 508 with an upper surface 510 and fluid confinement projections 512 formed spaced apart on the upper surface of the horizontal plate. A dielectric layer 513 covers each of the fluid confinement projections 512. The fluid confinement projections 512 function both as stoppers to prevent electrodes from crashing one against the other and to contain or confine a particular volume of conductive liquid 503 between adjacent fluid confinement projections 512. Thus, in the embodiment of FIG. 5 the conductive fluid 503 on the left is confined between the leftmost fluid confinement projection 512 and the middle fluid confinement projection while the conductive fluid on the right is confined between the middle fluid confinement projection and the rightmost fluid confinement projection.

The electrode 504 has a structure similar to the structure of the electrode 202 of FIGS. 2A and 2B as mentioned above. Thus, the electrode 504 includes a horizontal plate 514 with vertical projections 516 extending from a lower surface of the horizontal plate and a dielectric layer 518 covering the vertical projections and portions of the horizontal plate. The vertical projections 516 are arranged spaced apart on the horizontal plate 514 so that they extend between adjacent fluid confinement projections 512 and into the conductive fluid 503 confined between such adjacent fluid confinement projections. In operation, responsive to movement of the electrode 504 relative to the electrode 506 in three dimensions along the X-, Y- and Z-axes and relative to the conductive fluid 503 on the electrode 506, the EHS device 500 generates a voltage VHARV (not shown in FIG. 5) across the electrodes 504 and 506. The electrodes 504 and 506 can have different structures, similar to what previously described for FIG. 3A and FIG. 4.

Figure 6:
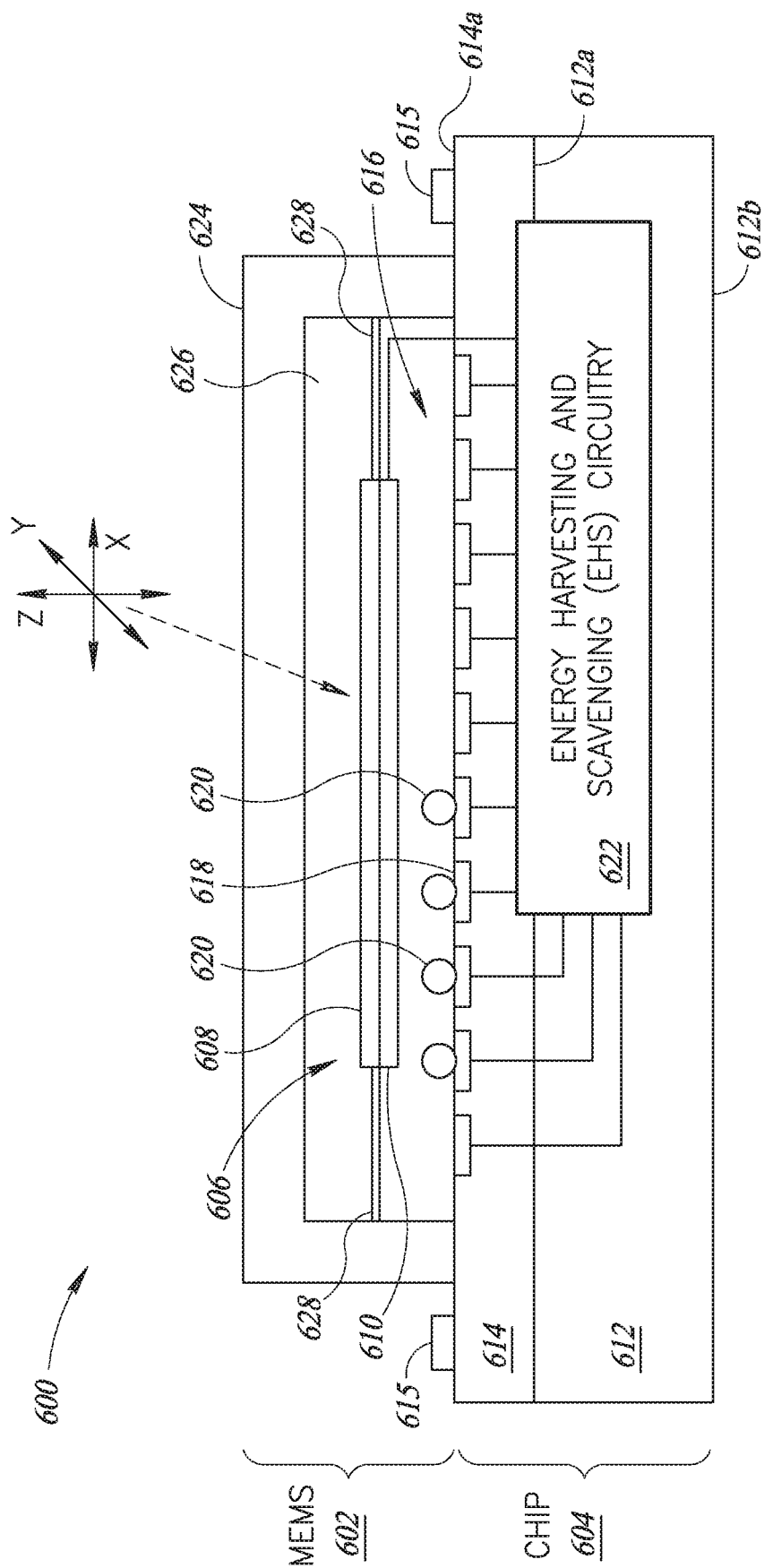
FIG. 6 is a cross-sectional schematic diagram of a reverse electrowetting EHS device including a microelectromechanical systems (MEMS) device and a first semiconductor chip according to one embodiment of the present disclosure.

FIG. 6 is a cross-sectional schematic diagram of a reverse electrowetting EHS device 600 including a microelectromechanical systems (MEMS) device 602 and a first semiconductor chip 604 according to one embodiment of the present disclosure. The MEMS device 602 includes the moveable electrode portion of the EHS device 600, such as in the EHS devices 100-500 described above with reference to FIGS. 1-5, while the other electrode portion of the EHS device is formed in the first semiconductor chip 604. The MEMS device 602 includes a moveable mass 606 that forms the moveable electrode portion of the EHS device 600. The moveable mass 606 include a support layer 608 on which a moveable electrode 610 is formed. The moveable electrode 610 has the structure of any of the moveable electrodes of the EHS devices 100-500 described above with reference to FIGS. 1-5. The moveable electrode 610 is formed from a suitable conductive material and may include a suitable dielectric layer or layers as part of the moveable electrode, such as in the embodiments of FIG. 1C and FIGS. 2-5.

The first semiconductor chip 604 may be, for example, an application specific integrated circuit (ASIC) or a system-on-a-chip (SOC) type integrated circuit or chip. The chip 604 includes a substrate 612 made of semiconductor material such as silicon, for example. The substrate 612 has a first face 612a and an opposite second face 612b. Formed on the first face 612a of the substrate 612 is a structural layer 614, and may be made of dielectric on the first face 612a of the substrate. The structural layer 614 includes an upper surface 614a on which bonding pads 615 are formed to provide for the electrical connection of the EHS device 600 to external circuitry (not shown). Inside the structural layer 614 may be present at least a level of conductive traces along with required dielectric layers to form an electrode 616 of the EHS device 600. In the illustrated embodiment, the electrode 616 includes a number of individual electrode segments 618 formed in the structural layer 614.

The specific structure of the individual electrode segments 618 varies in different embodiments of the EHS device 600, and could correspond to the structures for the electrodes described for the EHS devices 100-500 of FIGS. 1-5. In the embodiment of FIG. 6, each of the electrode segments 618 is a conductive plate. In other embodiments, each electrode segment 618 includes a conductive portion along with a suitable dielectric layer or layers as part of the electrode segment, as in the embodiments of FIGS. 1-5. A volume of conductive fluid 620 is then placed on each of the electrode segments 618 such that the conductive fluid is positioned between the electrode segments and the moveable electrode 610. Although the electrode 616 is formed in the structural layer 614 in the embodiment of FIG. 6, in other embodiments the electrode may be formed in the substrate 612, or in both the substrate and the structural layer.

The EHS device 600 further includes an energy harvesting and scavenging (EHS) electrical component or circuitry 622 formed in the substrate 612 or, alternatively, in the structural layer 614, or in both the substrate and structural layer. The EHS circuitry 622 could also be formed in neither the substrate 612 nor the structural layer 614, but instead may be formed external to the chip 604 and be electrically coupled to the chip. In the embodiment of FIG. 6, the EHS circuitry 622 is electrically coupled to each of the electrode segments 618 forming the electrode 616. The EHS circuitry 622 is also electrically coupled to the moveable electrode 610. In operation, the EHS circuitry 622 supplies a DC bias voltage across the moveable electrode 610 and electrode 616 and captures electrical energy generated responsive to mechanical energy causing three-dimensional motion of the moveable mass 606 and thereby the moveable electrode relative to the conductive liquid 620 and electrode 616, as will be described in more detail below.

The MEMS device 602 includes a packaging structure 624 that is set directly on the top surface 614a of the structural layer 614 in the embodiment of FIG. 6. Alternatively, the MEMS device 602 can be set facing the top surface 614a of the structural layer 614 but separated from the structural layer by means of one or more coupling layers, for example a layer of adhesive material (not shown). In this way, the packaging structure 624 of the MEMS device 602 is fixed with respect to the first semiconductor chip 604. The packaging structure 624 defines an internal cavity 626 of the MEMS device 602 where the internal cavity houses the moveable mass 606 that is suspended within the internal cavity by means of a supporting structure 628.

The supporting structure 628 suspends the moveable mass 606 within the internal cavity 626 such that the moveable mass is mobile or capable of moving in three dimensions. This three-dimensional movement of the moveable mass 606 is represented through X, Y and Z axes shown in the upper center portion of FIG. 6. In other embodiments the moveable mass 606 is moveable in fewer than three dimensions, but three-dimensional movement of the moveable mass is preferable since this should result in a larger capture of electrical energy responsive to movement of the moveable mass, as will be appreciated by those skilled in the art. The packaging structure 624 and the supporting structure 628 may be made of semiconductor material such as silicon in the embodiment of FIG. 6, but in general the packaging structure and the supporting structure as well as the support layer 608 of the moveable mass 606 may be made of materials other than a semiconductor material. A suitable material would be selected, at least in part, on the basis of desired characteristics of flexibility and strength of the material for use in formation of the packaging structure 624, the supporting structure 628 and possibly the support layer 608 as well.

In the embodiment of FIG. 6 the MEMS device 602 is positioned on the semiconductor chip 604, but the MEMS device may be mounted to or attached to other devices as well. Instead of the chip 604, for example, the MEMS device 602 could be positioned on a substrate, in which for example the electrode 616 may be created, such as the substrate 612 made of a semiconductor material or a substrate made of another material, for example ceramic, glass or a printed circuit board (PCB) material that may be rigid or flexible. In such an embodiment, the EHS circuitry 622 could be formed in the substrate 612 or external to the substrate. In addition, although the embodiment of FIG. 6 includes the MEMS device 602, other electromechanical systems (EMS) devices could be utilized in the EHS device 600 in place of the MEMS device 602 in other embodiments of the present disclosure. Such an EMS device could be a discrete system formed from discrete components or parts also created using different materials and assembled together, as opposed to the MEMS device 602 formed in a semiconductor substrate using semiconductor device fabrication technologies, as will be appreciated by those skilled in the art.

In operation of the EHS device 600, external forces produce stresses that cause movement of the moveable mass 606 relative to the chip 604 and thereby relative to the conductive liquid 620 and the electrode segments 618. The movement of the moveable mass 606 and thereby the moveable electrode 610 cause a change in surface overlap of the conductive liquid 620 on the moveable electrode, generating electrical energy across the moveable electrode and the electrode 616 through the reverse electrowetting phenomena as previously described.

Figure 6A:
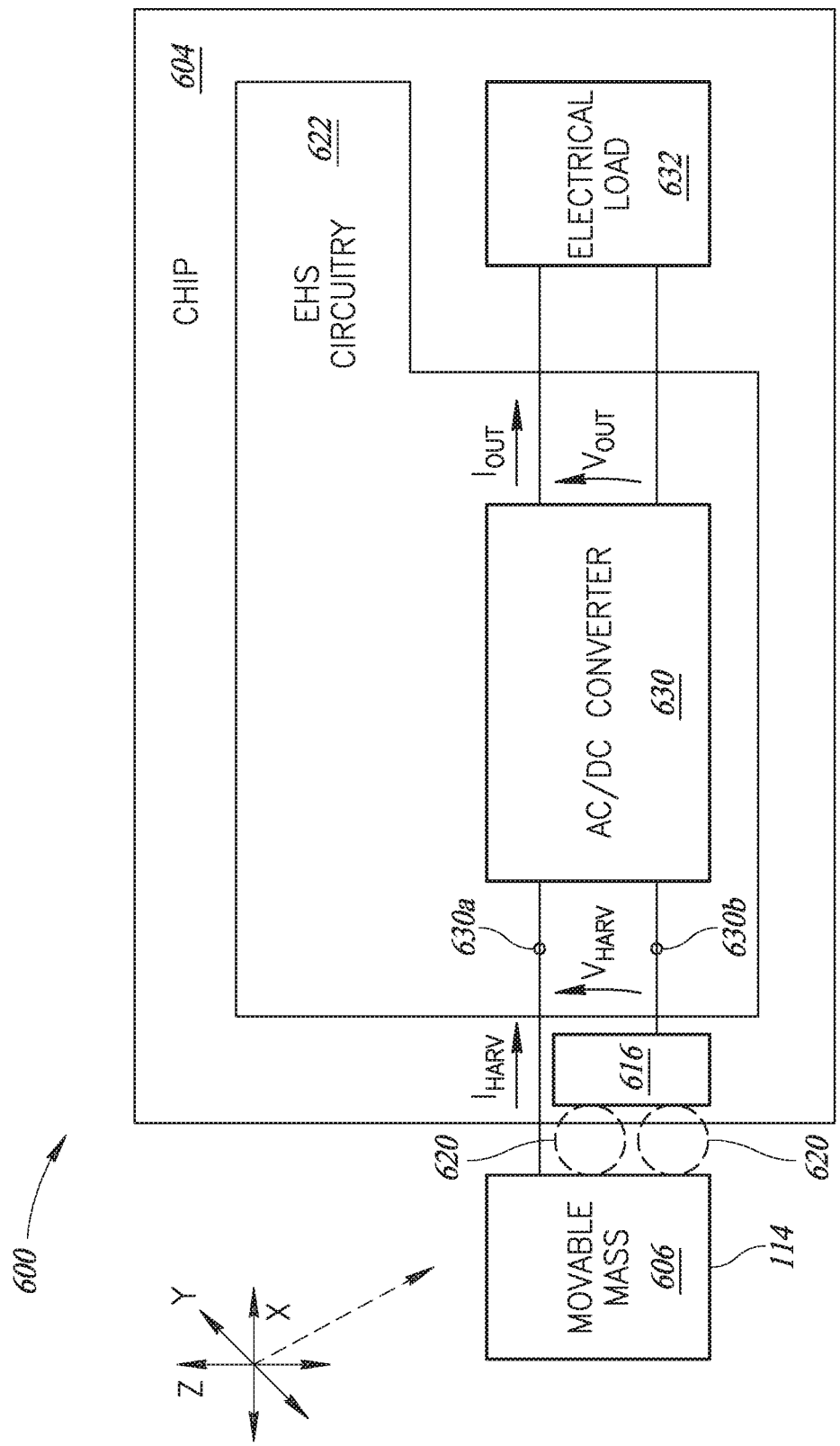
FIG. 6A is a functional diagram illustrating the operation of the reverse electrowetting EHS device of FIG. 6.

FIG. 6A is a functional diagram illustrating in more detail the operation of the EHS device 600 of FIG. 6. External forces applied to an electronic device including the EHS device 600 result in movement of the moveable mass 606 relative to the electrode 616 and conductive liquid 620. This movement of the moveable mass 606 can occur in three dimensions, namely along and X axis, Y axis, and Z axis as previously mentioned and as once again represented through these three axes shown in the upper left portion of FIG. 6A. This movement of the moveable mass 606 results in changes in the overlap of the area of the conductive liquid 620 on the moveable mass (i.e., on the moveable electrode 610) to thereby generate a harvested and scavenged voltage current IHARV and voltage VHARV across the moveable mass (i.e., moveable electrode 610) and the electrode 616 through the reverse electrowetting phenomena.

The EHS circuitry 622 may include an AC/DC converter 630 having a first terminal 630a coupled to the moveable mass 606 (i.e., the moveable electrode 610) and a second terminal 630b coupled to the electrode 616. The movement of the moveable mass 606 generates the current IHARV and voltage VHARV which vary as a function of time due to the movement of the moveable mass relative to the conductive fluid 620. The AC/DC converter 630 converts this time varying current IHARV and voltage VHARV into a DC output voltage VOUT and current IOUT that can then be used to provide power to an electrical load 632. Thus, the AC/DC converter 630 contained in the EHS circuitry 622 generates the DC output voltage Vout and DC output current Iout from the time varying voltage VHARV and current IHARV. The electrical load 632 may be contained in the first semiconductor chip 604 as shown in FIG. 6A or may be external to the chip, and for example it may be another electronic system or an energy storage device like a battery or a super-capacitor. One skilled in the art will understand various suitable circuits that may be utilized for forming the AC/DC converter 630. For example, the AC/DC converter 630 may include rectification circuitry that rectifies the time varying or AC voltage and current VHARV, IHARV to generate a rectified voltage that is then applied to a capacitive circuit to filter this rectified voltage and store electrical energy to thereby provide the output voltage Vout and current Iout from the AC/DC converter. The term "AC" is used to indicate a signal or quantity that is alternating or varying over time while the term "DC" is used to indicate a signal or quantity that is relatively constant over time, as will be appreciated by those skilled in the art. Thus, the time varying voltage and current VHARV, IHARV are AC signals while the output voltage Vout and current Iout are DC signals.

Figure 6B:
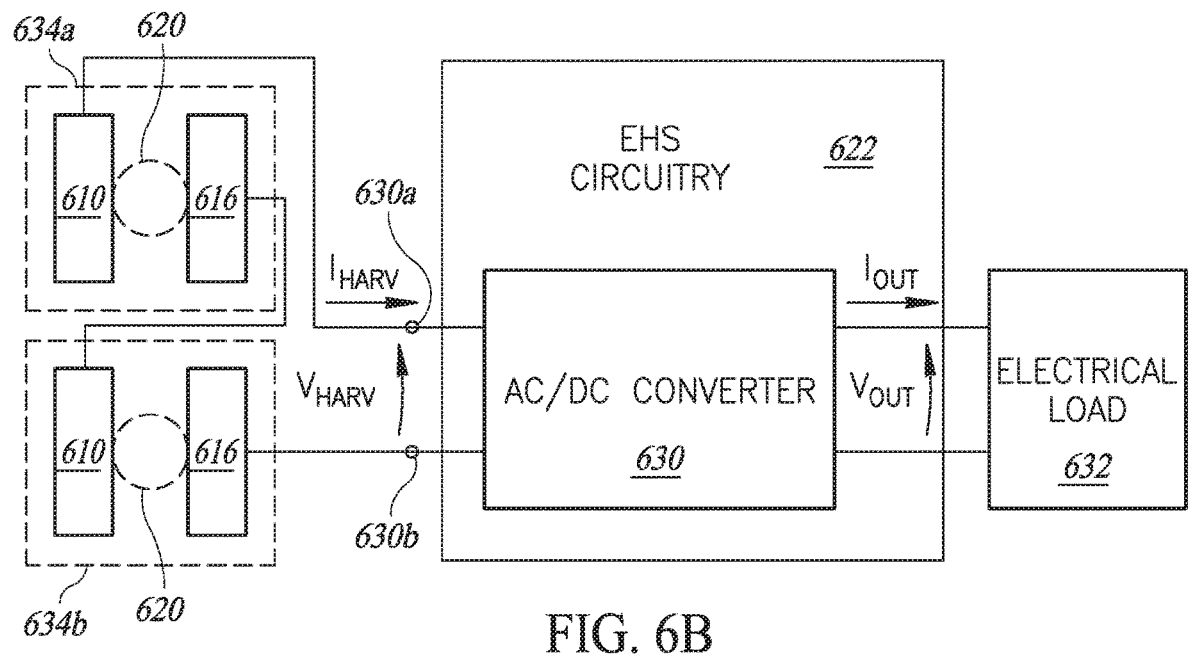
FIG. 6B is a functional and schematic diagram illustrating another embodiment of the EHS circuitry and MEMS device of FIG. 6 in which two reverse electrowetting structures are coupled in series.

FIG. 6B is a functional and schematic diagram illustrating another embodiment of the EHS circuitry 622 and MEMS device 602 of FIG. 6 in which two reverse electrowetting structures 634a and 634b are coupled in series. In this embodiment, the movable mass 606 includes two moveable electrodes 610, each moveable electrode operable with a corresponding electrode 616. Each electrode 616 would be formed from a group of electrode segments 618 formed in or on the structural layer 614 of the first semiconductor chip 604. The electrode 616 of the reverse electrowetting structure 634a is coupled to the moveable electrode 610 of the reverse electrowetting structure 634b. The AC/DC converter 630 is contained in the EHS circuitry 622 and the terminal 630a is coupled to the moveable electrode 610 of the structure 634a while the terminal 630b is coupled to the electrode 616 of the structure 634b. Once again, movement of the movable masses 610 in the structures 634a and 634b results in generation of the time varying voltage VHARV and current IHARV are generated responsive to the movement and the based on the reverse electrowetting phenomena. The AC/DC converter 602 once again generates a DC output voltage Vout and a DC output current Iout from the time varying or AC voltage VHARV and current IHARV from the structures 634a and 634b and supplies this output voltage and current to drive the electrical load 632.

Figure 6C:
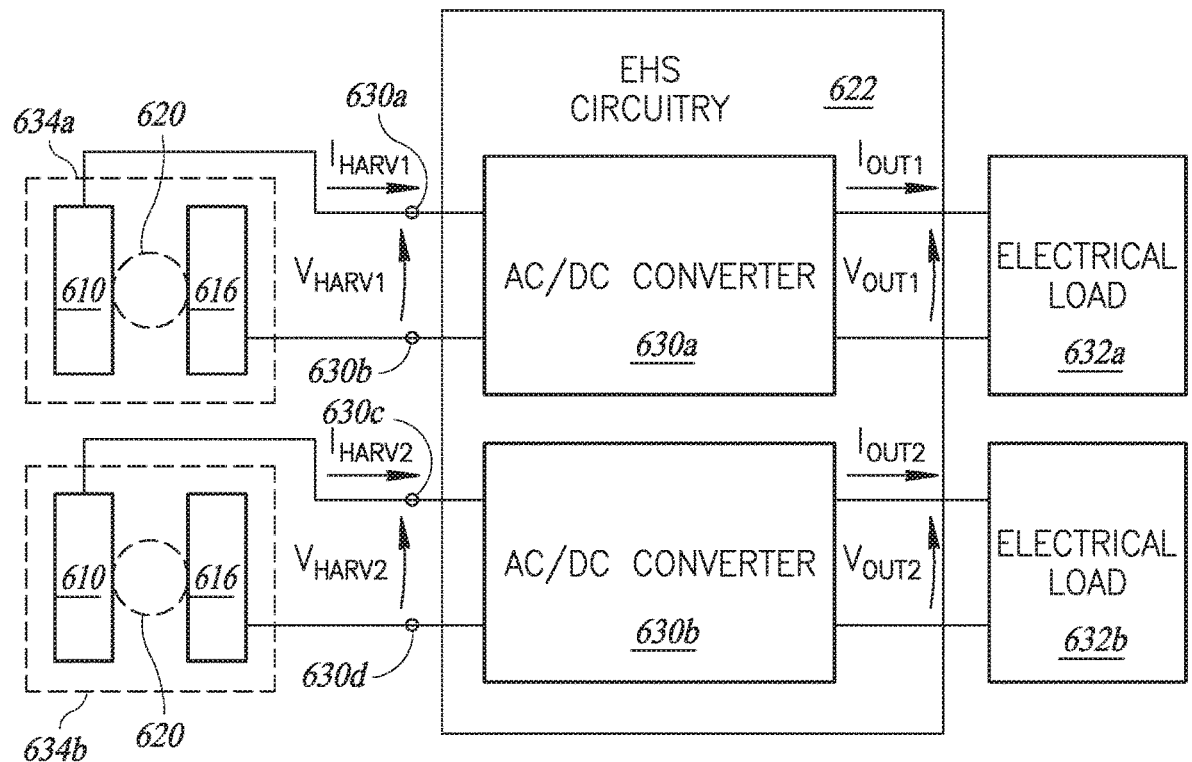
FIG. 6C is a functional and schematic diagram illustrating another embodiment of the EHS device of FIG. 6 including independent reverse electrowetting structures for generating dual independent voltages.

FIG. 6C is a functional and schematic diagram illustrating another embodiment of the EHS device 600 of FIG. 6 including independent reverse electrowetting structures 634a, 634b for generating dual independent voltages VHARV1, VHARV2 and currents IHARV1, IHARV2. The first reverse electrowetting structure 634a includes a movable mass 610 coupled to terminal 630a of a first AC/DC converter 630a contained in the EHS circuitry 622. The AC/DC converter 630a generates a DC output voltage Vout1 and current Iout1 that drive a first electrical load 632a. Similarly, the second reverse electrowetting structure 634b includes a moveable mass 610 coupled to terminal 630c of a second AC/DC converter 630b that generates a DC output voltage Vout2 and current Iout2 that drive a second electrical load 632b. In a variation (not shown), the reverse electrowetting structures 634a and 634b may be coupled in parallel to a single AC/DC converter 630. In another variation (not shown), the AC/DC converters 630a, 630b may be coupled in series or in parallel to a single electrical load 632. The reverse electrowetting structures 634a and 634b are formed in one embodiment by the moveable electrode 404 and electrode 408 in the embodiment of FIG. 4.

Figure 7:
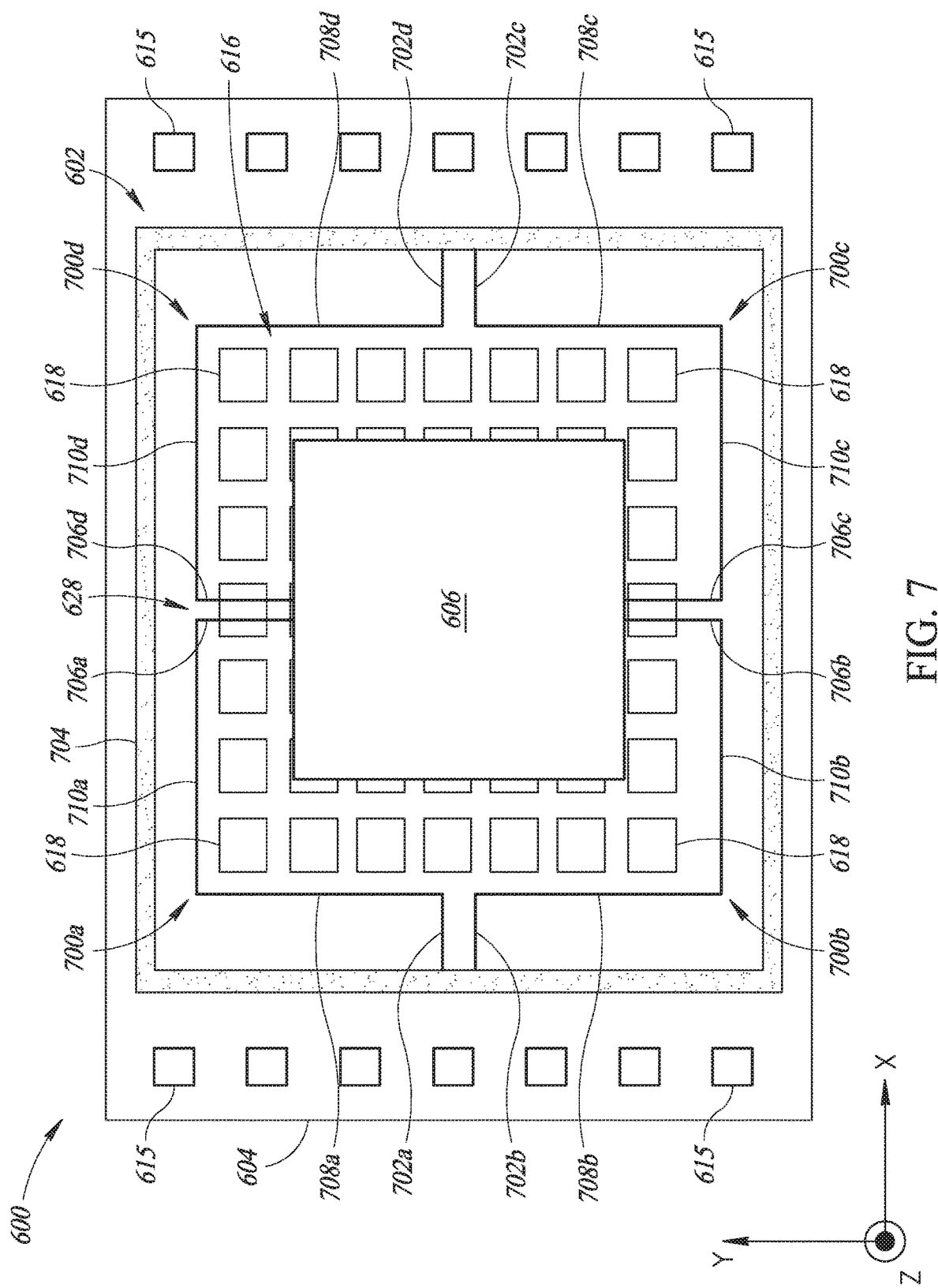
FIG. 7 is a top view showing in more detail the supporting structure of the moveable mass in the MEMS device of FIG. 6 according to one embodiment of the present disclosure.

FIG. 7 is a top view showing in more detail the supporting structure 628 of the moveable mass 606 in the MEMS device 602 of FIG. 6 according to one embodiment of the present disclosure. The top view of FIG. 7 shows components contained within the internal cavity 626 of the MEMS device 602 with the top portion of the packaging structure 624 removed to expose the internal cavity. In the embodiment of FIG. 7, the supporting structure 628 has four springs or balancers or arms 700a-700d. Each arm 700a-700d has a first end 702a-702d coupled to a respective wall 704 of the packaging structure 624 (that is a frame in the section here shown in FIG. 7), where the walls 704 along with the top (not shown) form the internal cavity 626 of the MEMS device 602. Each arm 700a-700d further includes a second end 706a-706d coupled to the moveable mass 606. More specifically, although not expressly shown in FIG. 7, the second ends 706a-706d are coupled to the support layer 608 of the moveable mass 606. The bonding pads 615 are also shown in FIG. 7 although only selected ones of these bonding pads are labeled with reference number 615 merely to simplify the figure.

In the embodiment of FIG. 7, the moveable mass 606 is a plate having a square shape but in other embodiments different shapes may be utilized. Obviously the shape of supporting structure 628 depends on the shape of moveable mass 606. The respective first ends 702a and 702b of the arms 700a and 700b are coupled to the same wall 704 of the packaging structure 624. Likewise, the respective first ends 702c and 702d of the arms 700c and 700d are coupled to the same wall 704 of the packaging structure 624, where this wall is diametrically opposite to the 704 to which the first ends 702a, 702b of the arms 700a, 700b are coupled. Thus, the first ends 702a, 702b of the arms 700a and 700b are coupled to the wall 704 on the left of FIG. 7 and the first ends 702c, 702d of the arms 700c and 700d are coupled to the wall 704 on the right of FIG. 7. The respective second ends 706a and 706d of the arms 700a and 700d are coupled to the same side of the moveable mass 606, which is the top side in FIG. 7. The respective second ends 706b and 706c of the arms 700b and 700c are coupled to the same side of the moveable mass 706, which is the bottom side of the moveable mass 606. Thus, the second ends 706a and 706d are coupled to a side of the moveable mass 606 that is diametrically opposite to the side of the moveable mass to which the second ends 706b and 706c are coupled.

Each arm 700a-700d further includes between the corresponding first ends 702a-702d and second ends 706a-706d respective first arm portions 708a-708d and second arm portions 710a-710d having preferred directions of extension orthogonal to one another. With reference to the axes represented in the lower left portion of FIG. 7, each of the first arm portions 708a-708d has a preferred direction of extension along the Y axis while the second arm portions 710a-710d each has a preferred direction of extension along the X axis.

In operation, when the moveable mass 606 is subjected to an external force, bending or stretching of angles between the various portions 708, 710 and ends 702, 706 of the arms 700 occurs based upon the direction and orientation of the external force applied to the moveable mass. For example, in the case of a Y-directed force with an orientation from bottom to top in FIG. 7, such as due to inertial reaction to the force of gravity along the Y axis applied to the EHS device 600, then the angles formed by second end 706b and second arm portion 710b and the second end 706c and second arm portion 710c are stretched due to the external force. Conversely, in this situation the angles formed by the first arm portion 708b and the second arm portion 710b and the first arm portion 708b and the first end 702b are bent. The same is true for the angles formed by the first arm portion 708c and the second arm portion 710c and the first arm portion 708c and the first end 702c, namely these angles are bent in this situation.

In a similar way, if the moveable mass 606 is subjected to an external force acting along the X axis, the moveable mass 606 is set in motion along the X axis through the supporting structure 628 in a manner similar to that just described for a Y-directed force. The supporting structure 628 also allows movement of the moveable mass 606 along the Z axis in an analogous manner. The same is true for external forces having components along multiple axes at the same time, such as along both the X axis and along the Y axis, for example, with the supporting structure 628 allowing movement of the moveable mass 606 responsive to the external force.

The arms 700a-700d and the moveable mass 606 may be produced in the same etching step during manufacturing of the MEMS device 602. More specifically, the arms 700a-700d and the support layer 608 may be formed through the same etching step. In this case, the support layer 608 of the moveable mass 606 and the arms 700a-700d are made of the same material, and no discontinuities are present between the support layer and the arms. The moveable mass 606 includes the moveable electrode 610 attached to the support layer 608. The moveable electrode 610 has a suitable structure as previously discussed, and may be formed on or attached to the support layer 608 through any suitable techniques, as will be appreciated by those skilled in the art.

Figure 8:
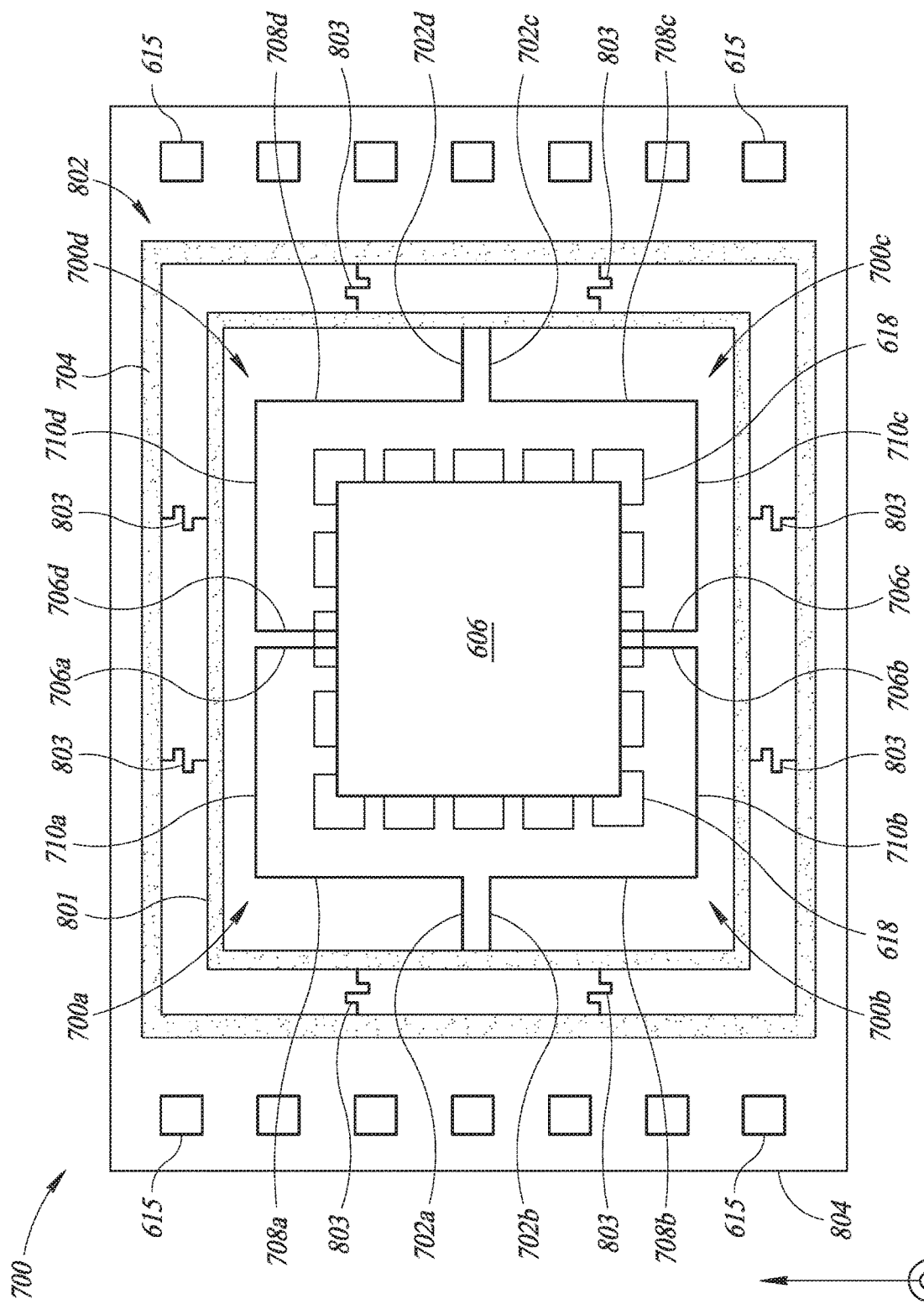
FIG. 8 is a top view of a reverse electrowetting EHS device that provides compensation for planarity errors between the moveable mass of the MEMS device and the other electrode segments of the semiconductor chip according to a further embodiment of the present disclosure.

FIG. 8 is a top view of a reverse electrowetting EHS device 800 that provides compensation for planarity errors between a moveable mass of a MEMS device 802 and electrode segments of a semiconductor chip 804 according to a further embodiment of the present disclosure. Components of the EHS device 600 of FIGS. 6 and 7 that are the same as or similar to corresponding components in the EHS device 800 have been given the same reference numbers and will not again be described in detail with reference to FIG. 8.

In the embodiment of FIG. 8, instead of the first ends 702a-d of the arms 700a-d being coupled to a respective wall 704 of the packaging structure 624 (FIG. 6), the MEMS device 802 includes an additional frame 801 positioned between the first ends and the corresponding wall of the packaging structure. The first ends 702a-d of the arms 700a-d are coupled to a corresponding wall of the additional frame 801 and the additional frame is, in turn, coupled through resilient arms or springs 802 to the walls 704 of the packaging structure 624. This structure allows for capacitive fine tuning or planarity error compensation of the EHS device 800, as will now be described in more detail with regard to FIGS. 9A and 9B.

FIGS. 9A and 9B are cross-sectional views of the EHS device 800 of FIG. 8 showing how the springs 802 coupled between the additional frame 801 and the packaging structure 624 along with vertical spacers 900 allow for the compensation of planarity errors between the moveable mass 606 and the electrode plates 618 of the electrode 616 formed in the first semiconductor chip 804. In FIG. 9A, the MEMS device 802 is shown above the semiconductor chip 804 prior to being bonded or attached to the chip. The moveable mass 606 is ideally parallel to the upper surface 614a of the structural layer 614 of the chip 804 so that the moveable electrode 610 is the same distance from each of the electrode segments 618 of the electrode 616.

When bonding the MEMS device 802 to the upper surface 614a of the structural layer 614 of the chip 804, the MEMS device may be attached such that the moveable mass 606 may be no longer parallel to upper surface 614a. This is illustrated in FIG. 9B, where more of an adhesive material 902 used to attach the MEMS device 802 to the chip 804 (or eventual other root causes of missed planarity) is present on the right hand side of the EHS device 800 as shown. As a result, if no additional frame 801 (FIG. 8), springs 802 and vertical spacers 900 were present the moveable electrode 610 on the movable mass 606 would not be parallel to the upper surface 614a. This would result in different portions of the moveable electrode 610 being different distances from the electrode segments 618, which is undesirable, because it introduces a difference in performance among several EHS devices 800 due to the assembly process. Instead, as seen in FIG. 9B the frame 801, springs 802 and vertical spacers 900 maintain the moveable mass 606 parallel to the surface 614a even in the presence of the uneven adhesive material 902 that resulted when the MEMS device 802 is attached to chip 804. This is true because the additional frame 801 and vertical spacers 900 position the moveable mass 606 properly while the springs 802 flex as required to allow for variations in the ideal position of the packaging structure 624 resulting (as an example) from the process of attaching the MEMS device 802 to the chip 804.

Vertical spacers 900 may be used to electrically couple the moveable mass 606 and the moveable electrode 610 with the chip 804 for example by means of pads (not shown) on upper surface 614a. Moreover, using these pads and vertical spacers 900 it may be possible also to test electrically the correct alignment of the moveable mass 606 and the chip 804 for example using a current that can flow from a first one of the vertical spacers 900 (e.g., the vertical spacer on the left in FIG. 9B) and a second one of the vertical spacers 900 (e.g., the vertical spacer on the right in FIG. 9B).

Figure 10:
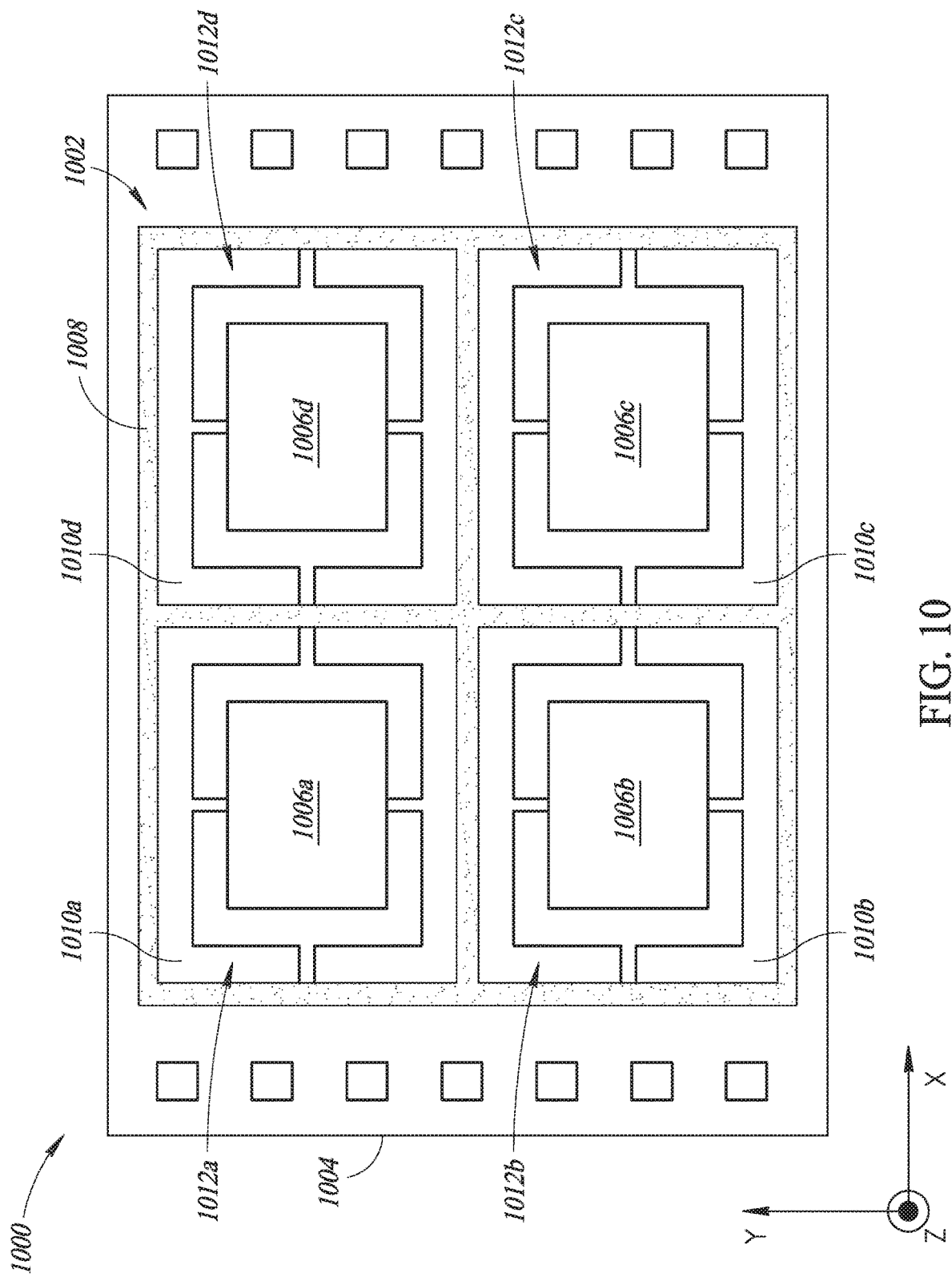
FIG. 10 is a top view of a reverse electrowetting EHS device including a MEMS device having multiple moveable masses according to another embodiment of the present disclosure.

FIG. 10 is a top view of a reverse electrowetting EHS device 1000 including a MEMS device 1002 and semiconductor chip 1004 where the MEMS device includes multiple moveable masses 1006*a-d* according to yet another embodiment of the present disclosure. In the EHS device 1000 multiple energy harvesting and scavenging structures are replicated in order to increase the amount of electrical energy harvested and/or scavenged by the EHS device. The inclusion of multiple energy harvesting and scavenging structures increases the energy simply by having more such structures generating energy and may increase captured energy by selectively capturing energy based on the spatial and frequency characteristics of the mechanical energy that causes movement of the moveable masses by increasing the efficiency of EHS device 1000, as will be explained in more detail below with reference to FIG. 11.

The MEMS 1002 includes a frame 1008 having walls that form four internal cavities 1010*a-d*, each internal cavity housing a corresponding movable mass 1006*a-d*. Each movable mass 1006*a-d* is coupled to corresponding walls of the frame 1008 through a respective supporting structure 1012*a-d*. The specific structure of the support structures 1012*a-d* and of the moveable masses 1006*a-d*, as well as the structure of the corresponding electrode structure (not shown in FIG. 10) for each moveable mass that is formed in the chip 1004, may vary in different embodiments of the EHS device 1000. For example, in one embodiment each moveable mass 1006*a-d* has the same structure as the moveable mass 606 of FIGS. 6 and 7 while the supporting structures 1012*a-d* have the same structure as the supporting structure 628 of FIGS. 6 and 7. In this embodiment, the structure of the electrode (not shown) corresponding to each moveable mass 1006*a-d* is the same as the electrode 616 (or electrode segments 618 forming the electrode 616) of FIGS. 6 and 7. In other embodiments, the structure of the moveable mass 1006*a*, supporting structure 1012*a-d* and electrode may have any suitable structure, such as structures for these components as previously described for the embodiments of FIGS. 1-9.

Figure 11:
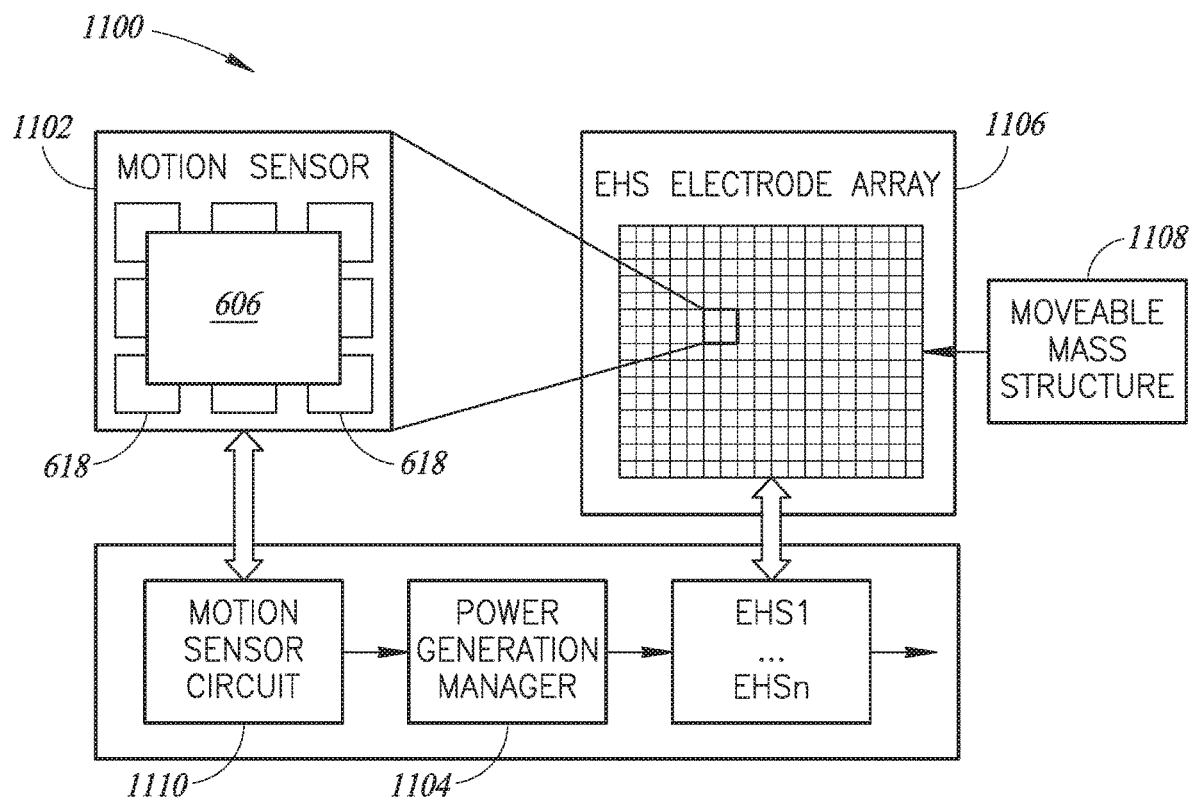
FIG. 11 is a functional and schematic diagram of an intelligent reverse electrowetting EHS device including a motion sensor and intelligent power generation management circuitry according to yet another embodiment of the present disclosure.

FIG. 11 is a functional and schematic diagram of an intelligent reverse electrowetting EHS device 1100 including a motion sensor 1102 and intelligent power generation management circuitry 1104 according to yet another embodiment of the present disclosure. The intelligent EHS device 1100 includes an EHS electrode array 1106, which is represented in the figure through an array of squares, each square in the array representing an individual electrode structure or a portion of such electrode structure. A movable mass structure 1108 includes one or more moveable masses that are not expressly shown in FIG. 11, with each of these moveable masses being positioned relative to a corresponding individual electrode structure in the electrode array 1106.

The motion sensor 1102 generates a signal responsive to movement of the moveable mass or masses in the moveable mass structure 1108. A motion sensor circuit 1110 senses the signal generated by the motion sensor 1102 and processes this signal to detect the direction of movement of the moveable mass or masses in the moveable mass structure 1108. The motion sensor 1102 can be a separate component, such as an accelerometer or gyroscope, which is suitable attached to moveable mass structure 1108 to detect the direction of movement. Alternatively, the motion sensor 1102 can be formed from a portion of the electrode array 1106 and moveable mass structure 1108. Such an embodiment is illustrated in FIG. 11. In this sample embodiment of the motion sensor 1102, the motion sensor includes a single moveable mass, such as the moveable mass 602 of FIG. 6-8 or 1006 of FIG. 10. The motion sensor 1102 also includes a number of electrode segments, such as the electrode segments 618 of FIGS. 6-8. In this embodiment the motion sensor 1102 is formed by the moveable mass 602 and several electrode segments 618, which means that this moveable mass and electrode segments are not utilized in capturing electrical energy but instead are used to form the motion sensor. Other embodiments of the motion sensor 1102 are of course possible, for example increasing the number of moveable masses and increasing or decreasing the number of electrode segments. In another embodiment, not shown, the moveable mass 606 and electrode segments 618 could be formed in the corners of EHS electrode array 1106 to increase sensitivity of the motion sensor 1102.

The voltage generated across each electrode segment 618 and the moveable mass 606 will vary as a function of the direction of movement of the moveable mass relative to the electrode segments. The motion sensor circuit 1110 processes these voltages generated across respective electrode segments 618 and the movable mass 606 to detect the direction of movement of the moveable mass, as will be appreciated by those skilled in the art. Note that the moveable mass 606 may also include multiple segments, such as where the moveable mass 606 has the structure of the moveable mass 404 of FIG. 4, or multiple liquid drops deposited on the electrodes.

In operation, the motion sensor circuit 1110 senses the signal generated by the motion sensor 1102 to detect the direction of movement of the moveable mass structure 1108. The motion sensor circuit 1110 provides the detected direction of movement of the movable mass structure 1108 to the power generation management circuitry 1104. Utilizing the detected direction of movement of the movable mass structure 1108, the power generation management circuitry 1104 then controls a plurality of EHS circuits EHS1-EHSN that are coupled to the electrode array 1106 and moveable mass structure 1108 to capture electrical energy from selected electrodes and moveable masses in the array 1106 and moveable mass structure 1108. Each of the EHS circuits EHS1-EHSN corresponds to the EHS circuit 622 of FIG. 6 in one embodiment, as will be discussed in more detail below with reference to FIG. 12.

In this way, the intelligent EHS device 1100 may optimize or improve the power generation of the device by harvesting or scavenging energy from electrodes or electrode segments that are generating the most electrical energy due to the direction of movement of the movable mass structure 1108. The power generation management circuitry 1104 may in this way decide the best combination or coupling of the outputs from selected EHS coils and inputs-outputs of selected EHS circuits EHS1-EHSN that will maximize the generated electrical energy in agreement with the direction of movement of the movable mass 1108 contained thereon relative to the EHS array 1106.

Figure 12:
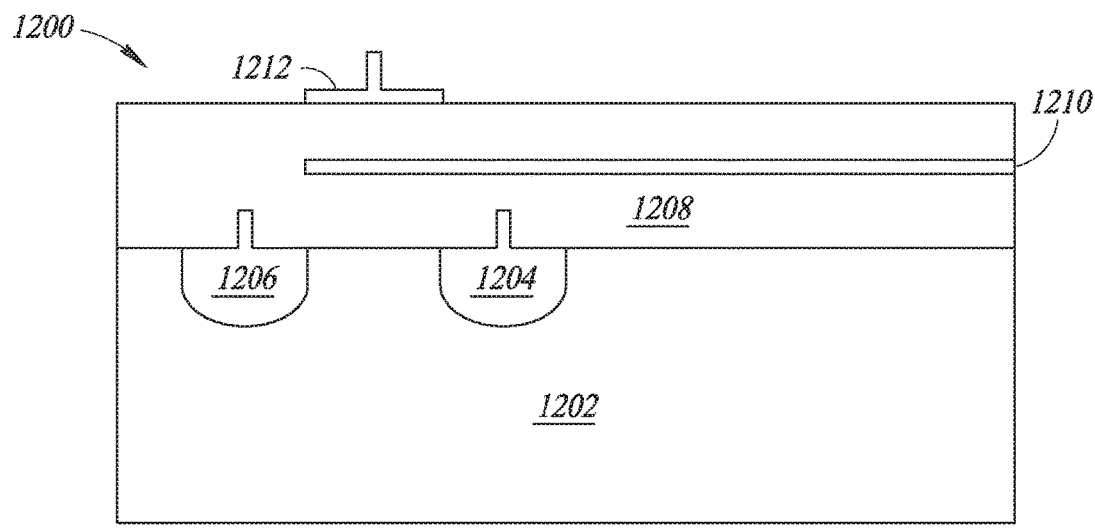
FIG. 12 is a cross-sectional schematic diagram of a floating gate metal-oxide-semiconductor (MOS) transistor that can be utilized to apply the voltage bias to the reverse electrowetting EHS devices of FIGS. 1-11 according to another embodiment of the present disclosure.

FIG. 12 is a cross-sectional schematic diagram of a Floating gate Avalanche MOS (metal-oxide-semiconductor) (FAMOS) transistor 1200 that may be utilized for voltage biasing in the reverse electrowetting EHS devices of FIGS. 1-11 according to another embodiment of the present disclosure. The FAMOS transistor 1200 is formed in a substrate 1202 and includes a drain region 1204 and source region 1206 formed in the substrate. A dielectric layer 1208 is formed on the substrate 1202 with an extended floating gate 1210 formed in the dielectric layer and a gate electrode 1212 formed on the dielectric layer. In operation or during a manufacturing process, a voltage bias is applied by injecting electrical charge into the Extended Floating Gate 1210 of the FAMOS 1200, or into a Floating Gate of a standard FAMOS, connected to a capacitor plate (not shown).

This increases energy harvesting efficiency as expected from reverse electrowetting physics, improving electrostatic induction due to injected electrical charges into the Extended Floating Gate. Multiple FAMOS transistors with common Floating Gates can speed up charging.

Figure 13:
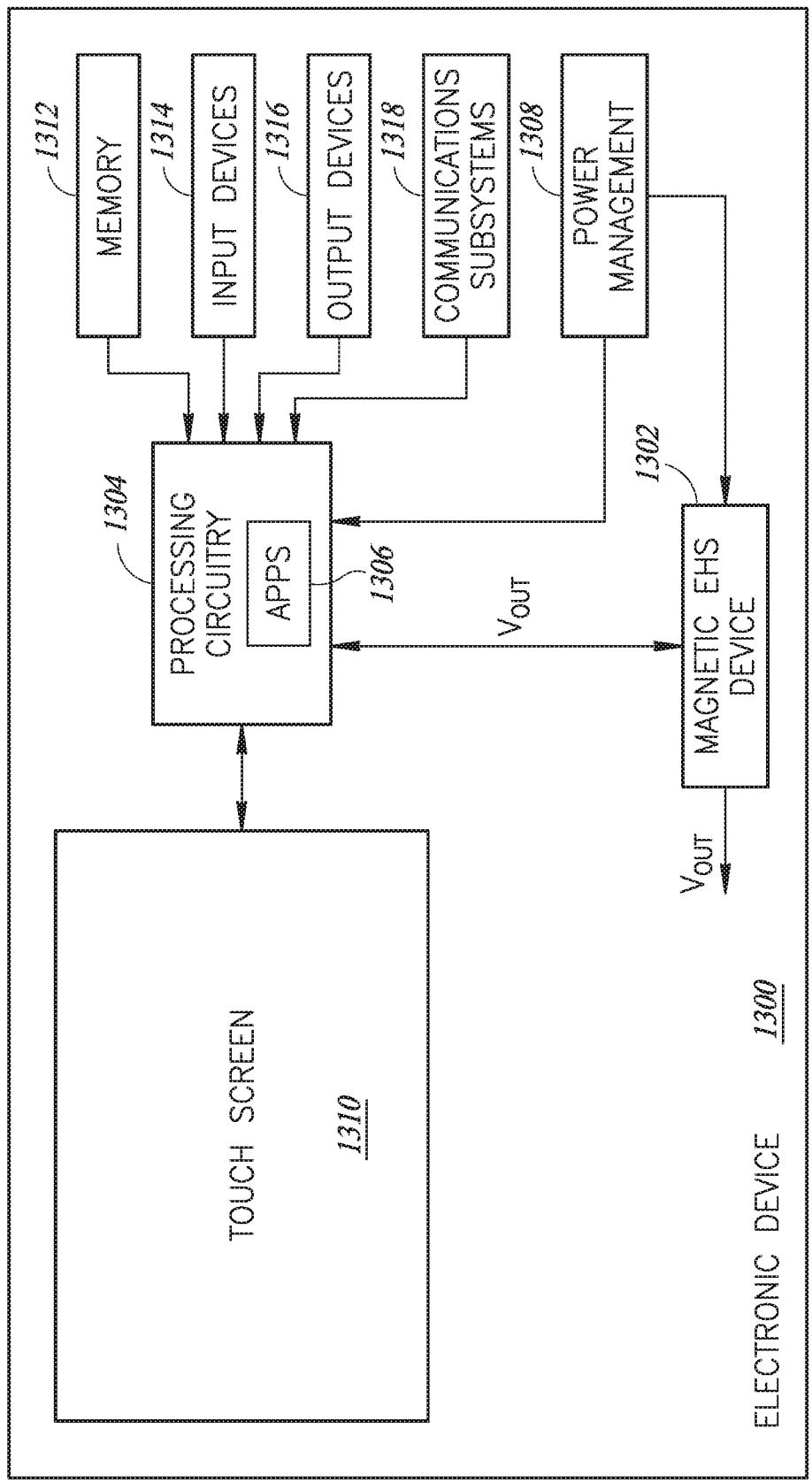
FIG. 13 is a functional block diagram of an electronic device including a reverse electrowetting EHS device according to any of the embodiments of FIGS. 1-12.

FIG. 13 is a functional block diagram of an electronic device 1300 including a reverse electrowetting EHS device 1302 according to any of the previously described embodiments of FIGS. 1-12. The electronic device 1300 in the example embodiment of FIG. 13 includes processing circuitry 1304 that controls the overall operation of the electronic device 1300 and also executes applications or "apps" 1306 that provide specific functionality for a user of the electronic device 1300. In operation, the reverse electrowetting EHS device 1302 generates electrical energy in response to movement of the electronic device 1300. The reverse electrowetting EHS device 1302 supplies this electrical energy, represented in the figure as an output voltage Vout from the reverse electrowetting EHS device 1302, to power the processing circuitry 1304 and other components in the electronic device 1300. The electronic device 1300 may be any type of electronic device, such as a smart phone, wearable electronic device like a heart rate or activity monitor, tablet computer, and so on. Depending on the type of electronic device 1300, the reverse electrowetting EHS device 2302 may generate enough electrical energy to fully power the electronic device or only enough to drive some of the electronic circuitry in the device, or enough to charge or help charge a battery of the electronic device.

A power management subsystem 1308 of the electronic device 1300 is coupled to the processing circuitry 1304 and would typically include a battery for powering the electronic device, and also control circuitry for controlling power-related operating modes of the device such as charging of the battery, power-savings modes, and so on. As mentioned above, the electrical energy generated by the reverse electrowetting EHS device 1302 may be used to charge such a battery contained in the power management subsystem 1308. The power management subsystem 1308 may also control operation of the reverse electrowetting EHS device 1302, such as by activating and deactivating the EHS circuitry (not shown) contained in the EHS device. Although shown separately in FIG. 13, the reverse electrowetting EHS device 1302 may be considered part of the power management subsystem 1308.

The electronic device 1300 further includes a video component such as a touch screen 1310 with a touch display (not shown) such as a liquid crystal display (LCD) and a touch panel (not shown) attached to or formed as an integral part of the touch display. In operation, the touch screen 1310 senses touches of a user of the electronic device 1300 and provides sensed touch information to the processing circuitry 1304 to thereby allow the user to interface with and control the operation of the electronic device. The processing circuitry 1304 also controls the touch screen 1310 to display desired visual content on the touch display portion of the touch screen. The action to touch the screen 1310 is also a mechanical stimulation that may be utilized in generating electrical energy by the reverse electrowetting EHS device 1302.

The electronic device 1300 further includes data storage or memory 1312 coupled to the processing circuitry 1304 for storing and retrieving data including the apps 1306 and other software executing on the processing circuitry and utilized by the electronic device 1300 during operation. Examples of typical types of memory 1312 include solid state memory such as DRAM, SRAM and FLASH, solid state drives (SSDs), and may include any other type of memory suited to the desired functionality of the electronic device 1300 including digital video disks (DVDs), compact disk read-only (CD-ROMs), compact disk read-write (CD-RW) memories, magnetic tape, hard and floppy magnetic disks, tape cassettes, and so on.

Input devices 1314 are coupled to the processing circuitry 1304 and may include a keypad, whether implemented through the touch screen 1310 or separately, a pressure sensor, accelerometer, microphone, keyboard, mouse, digital camera to capture still and video images, and other suitable input devices. Output devices 1316 are coupled to the processing circuitry 1304 and may include, for example, audio output devices such as a speaker, printer, vibration device, and so on. The input devices 1314 and output devices 1316 collectively may include other types of typical communications ports for the electronic device 1300, such as USB ports, HDMI ports, and so on. The electronic device 1300 further includes communications subsystems 1318 coupled to the processing circuitry 1304 and which may include Wi-Fi, GPS, cellular and Bluetooth subsystems for providing the device with the corresponding functionality. The specific type and number of input devices 1314, output devices 1316, communications subsystems 1318, and even the specific functionality of the power management subsystem 1308 will of course depend on the type of the electronic device 1300, which may be any suitable type of electronic device or system to which the reverse electrowetting EHS device 1302 may generate sufficient electrical power to improve the operation of the electronic device or system.

Figure 14:
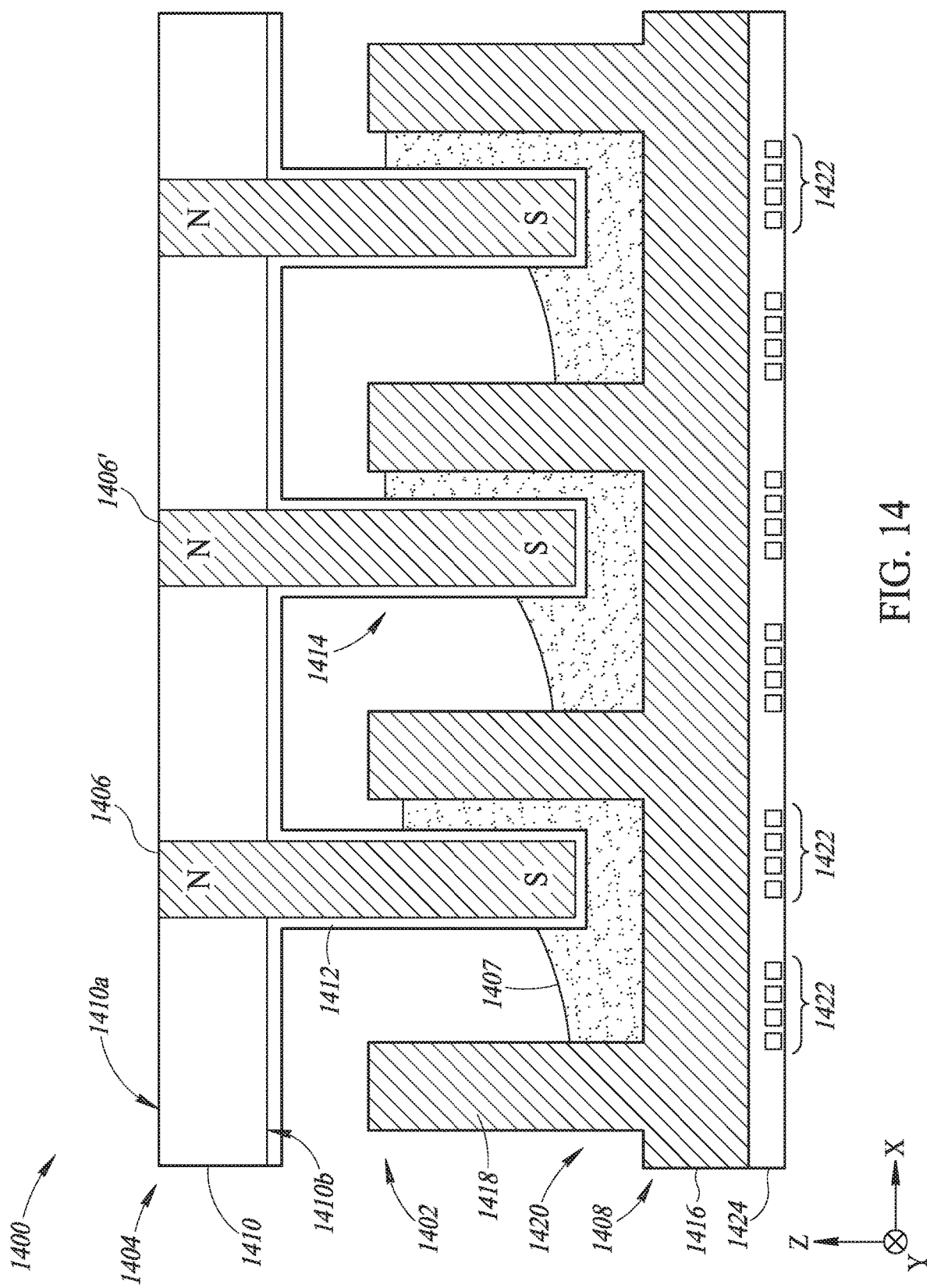
FIG. 14 is a cross-sectional schematic view of a combination EHS device that includes both a reverse electrowetting EHS device and a magnetic EHS device according to a further embodiment of the present disclosure.

FIG. 14 is a cross-sectional schematic view of a combination EHS device 1400 that includes both a reverse electrowetting EHS device or circuit and a magnetic EHS device or circuit that provides dual generation of electrical power according to a further embodiment of the present disclosure. In the combination EHS device 1400, in addition to the generation of electrical power through reverse electrowetting as described with reference to the embodiments of FIGS. 1-13, the combination EHS device includes components that generate electrical energy due to variations in magnetic flux responsive to movement of an electrode structure 1402 including a moveable electrode 1404. In this way, the combination EHS device 1400 generates additional electrical power relative to the embodiments of FIGS. 1-13. Furthermore, the inclusion of the magnetic EHS device provides additional flexibility for power generation by the combination EHS device 1400 through different configurations of the magnetic EHS device that enable the generation of electrical power having different desired characteristics, such as multi-phase electrical power, as will be described in more detail below.

The combination EHS device 1400 includes an interdigitated electrode structure 1402 including a three-dimensional comb-like moveable electrode 1404 having a structure similar to the electrode 202 of FIG. 2A except that this three-dimensional comb-like electrode includes permanent magnet segments 1406. These permanent magnet segments 1406 both enable the formation of vertical projections of the moveable electrode 1404 for the formation of the reverse electrowetting EHS device and also generate a magnetic field for utilization in the magnetic EHS device of the combination EHS device 1400, as will be explained in more detail below.

The three-dimensional comb-like movable electrode 1404 is moveable in three dimensions relative to a conductive fluid 1407 on a second electrode 1408. The three-dimensional comb-like moveable electrode 1404 is moveable along X-, Y- and Z-axes as shown in the lower left of the FIG. 14. The structure of the movable electrode 1404 is similar to the electrode 202 of FIGS. 2A and 2B and the movable electrode includes a horizontal plate 1410 having an upper surface 1410a and a lower surface 1410b. The permanent magnets 1406 extend through the horizontal plate 1410 form the upper surface 1410a and extend beyond the lower surface 1410b towards the second electrode 1408. A first dielectric layer 1412 covers the portions of the permanent magnet segments 1406 extending beyond the lower surface 1410b and covers the lower surface 1410b of the horizontal plate 1410. The permanent magnets 1406 do not extend all the way through the horizontal plate 1410 in other embodiments of the combination EHS device 1400.

The portions of the permanent magnet segments 1406 extending beyond the lower surface 1410b of the horizontal plate 1410 covered by the first dielectric layer 1412 form vertical projections 1414 that extend into the conductive fluid 1407 and towards the second electrode 1408. The second electrode 1408 and horizontal plate 1410 are made of a suitable conductive material. The second electrode 1408 includes a horizontal portion 1416 and vertical projection portions 1418 that extend from this horizontal portion towards the moveable electrode 1404. These vertical projection portions 1418 are interdigitated with the vertical projections 1414 of the moveable electrode 1404. Thus, each vertical projection portion 1418 is positioned between adjacent vertical projections 1414 of the moveable electrode 1404. A second dielectric layer (not shown) is formed over the vertical projection portions 1416 and remaining exposed portions of the second electrode 1408 in other another embodiment of the combination EHS device 1400.

The second electrode 1408 is formed on or is part of a chip 1420, a portion of which is shown in FIG. 14. The chip 1420 may correspond to the chip 604 of FIG. 6 and thus may be an ASIC including a substrate and a separate structural layer, which are not shown in FIG. 14. In another embodiment, the chip 604 of FIG. 6 may be overturned in FIG. 14, where a layer 1424 corresponds to layer 614 and the substrate 612 is formed by the electrode 1408, that may be created for example by anisotropic etching of the substrate. Formed in the chip 1420 are a number of EHS coils 1422, several of which are labeled in the figure. The EHS coils 1422 are spiral coils in the XY plane in the embodiment of FIG. 14. Thus, each EHS coil 1422 is represented as a series of squares corresponding to conductive trace starting from an inner point and extending in a curve outward in the XY plane to form each spiral EHS coil.

In operation of the magnetic EHS device of the combination EHS device 1400, each of the permanent magnet segments 1406 generates a magnetic field having components along the XYZ-axes. In another embodiment, permanent magnet segments 1406 and 1406' with the north poles N and south poles S may be in anti-parallel, then the north pole N of the permanent magnet segment 1406 is positioned adjacent the south pole S of the permanent magnet segment 1406', closing the magnetic field lines, and the same for the poles of other permanent magnet segments. Movement of the moveable electrode 1404 relative to the EHS coils 1422 results in variable magnetic fluxes of these magnetic fields through the EHS coils. This change in magnetic flux through the EHS coils 1422 results in magnetic energy being stored in the EHS coils. Magnetic EHS circuitry (not shown) formed in the chip 1420 is coupled to the EHS coils and captures this magnetic energy stored in the EHS coils 1422. The operation of such magnetic energy harvesting and scavenging systems is described in more detail in U.S. Patent Application Publication No. 2017/0093265A1, which is incorporated herein by reference in its entirety to the extent the teachings of this reference are not inconsistent with the specific teachings and definitions described herein. Aspects of the embodiments described in the present application can be modified, if necessary, to employ systems, circuits and concepts of this published application to provide still further embodiments.

FIG. 14 shows primarily the components of the magnet EHS device that is part of the combination EHS device 1400 and omits some of the components of the reverse electrowetting EHS device contained in the combination EHS device. This is done so as to simplify FIG. 14 in illustrating the magnetic EHS device and because these components of the reverse electrowetting EHS device are discussed above in detail with reference to FIGS. 1-13. For example, although not shown in FIG. 14 the chip 1420 includes the electrode segments (e.g., electrode segments 618 of FIG. 6) and an EHS electrical component or circuitry (e.g., EHS circuitry 622 of FIG. 6) to capture electrical energy generated responsive to mechanical energy causing three-dimensional motion of the moveable electrode 1404 relative to the conductive liquid 1407 and second electrode 1408. The magnetic EHS electrical component or circuitry (not shown) formed in the chip 1420 and coupled to the EHS coils 1422 as discussed above may be considered as being part of this EHS circuitry 622 or as being separate circuitry within the chip 1420.

Figure 15:
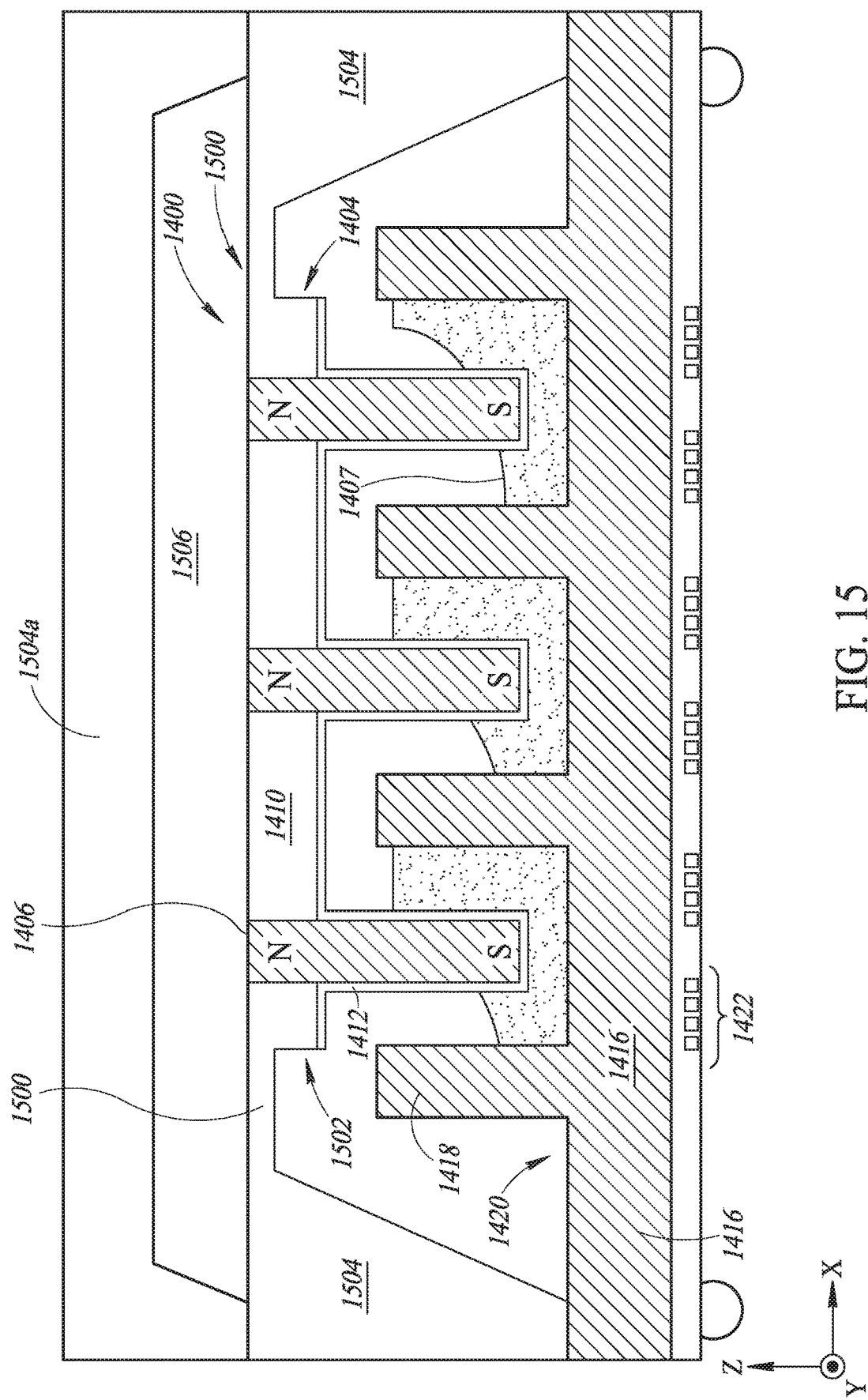
FIG. 15 is a cross-sectional schematic view of the combination EHS device of FIG. 14 further illustrating a supporting structure coupling a moveable mass of the EHS device to a packaging structure according to an embodiment of the present disclosure.

FIG. 15 is a cross-sectional schematic view of the combination EHS device 1400 of FIG. 14 further illustrating a supporting structure 1500 coupling a moveable mass 1502 including the moveable electrode 1404 of the combination EHS device to a packaging structure 1504 according to an embodiment of the present disclosure. The packaging structure 1504 includes a top portion or cap 1504a to provide an internal cavity 1506 to house the movable mass 1502 including the movable electrode 1404.

Figure 16:
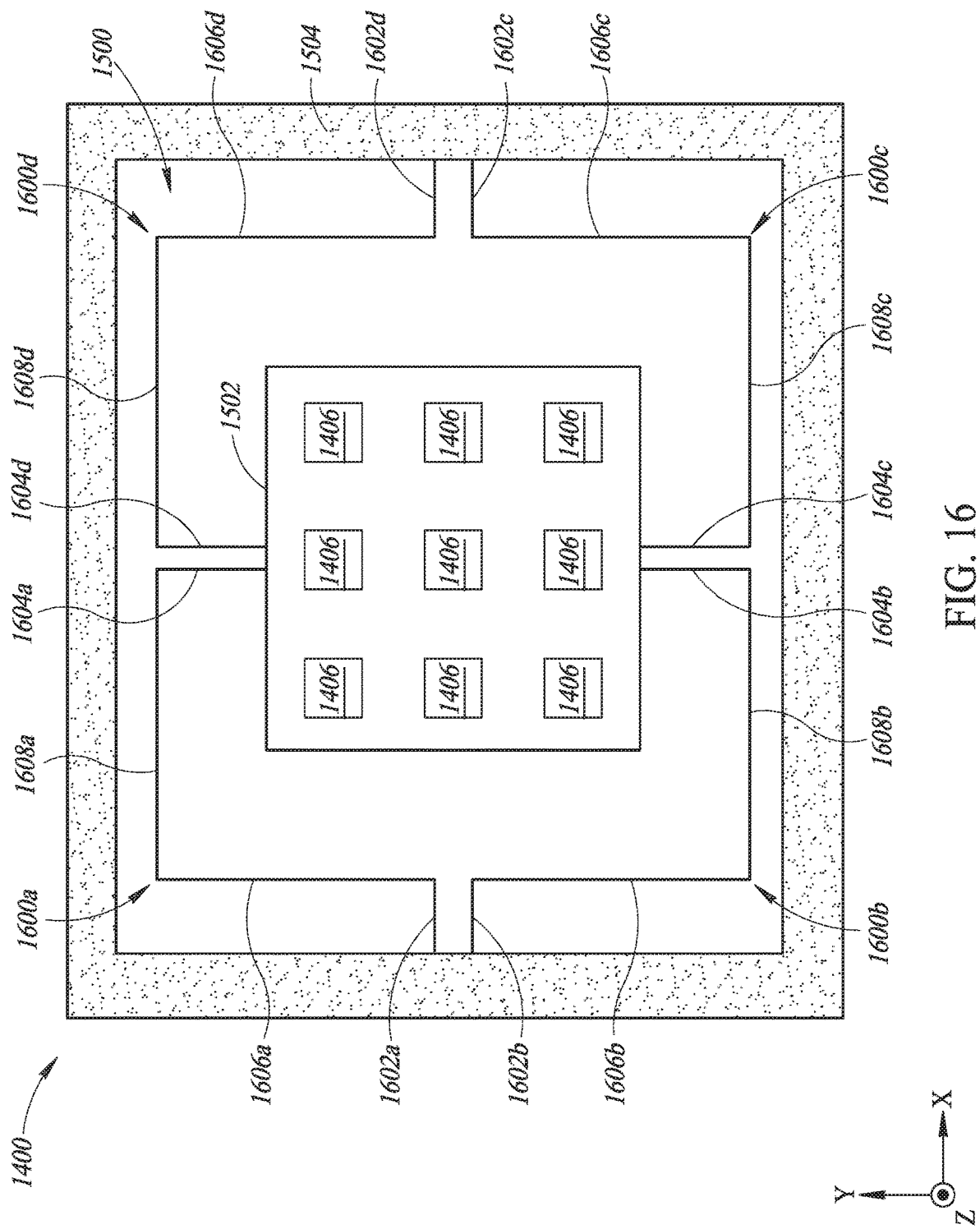
FIG. 16 is a simplified top view illustrating the moveable mass and the packaging and supporting structures of the combination EHS device of FIG. 15 according to an embodiment of the present disclosure.

FIG. 16 is a simplified top view illustrating the moveable mass 1502 and the supporting structure 1500 of the combination EHS device of FIG. 15 with the top portion or cap 1504a of the packaging structure 1504 removed according to an embodiment of the present disclosure. In addition, the second electrode 1408 and vertical projections 1418 of this electrode are not illustrated in the top view of FIG. 16 to simplify the figure for the discussion of the supporting structure 1500 and moveable mass 1502.

This simplified top view is similar to the embodiment of FIGS. 6 and 7 in relation to the structure of the moveable mass 1502 and the supporting structure 1500. The supporting structure 1500 has four springs or balancers or arms 1600a-1600d. Each arm 1600a-1600d has a first end 1602a-1602d coupled to a respective wall of the packaging structure 1504 (that is a frame in the section here shown in FIG. 16), where the walls along with the top 1504a (not shown) form the internal cavity 1506 of FIG. 15. Each arm 1600a-1600d further includes a second end 1604a-1604d coupled to the moveable mass 1502. The moveable mass 1502 may include a support layer such as the support layer 608 in FIG. 6, with the second ends 1604a-1604d coupled to this support layer of the moveable mass. Each arm 1600a-1600d further includes between the corresponding first ends 1602a-1602d and second ends 1604a-1604d respective first arm portions 1606a-1606d and second arm portions 1608a-1608d-710d having preferred directions of extension orthogonal to one another. With reference to the axes represented in the lower left portion of FIG. 7, each of the first arm portions 1606a-1606d has a preferred direction of extension along the Y axis while the second arm portions 1608a-1608d each has a preferred direction of extension along the X axis. In the embodiment of FIG. 16, the supporting structure 1500 is essentially the same as the supporting structure 628 of FIGS. 6 and 7, and the structure and operation of this supporting structure is described in more detail with reference to FIGS. 6 and 7 and accordingly will not again be described in detail with reference to FIG. 16.

Figure 17:
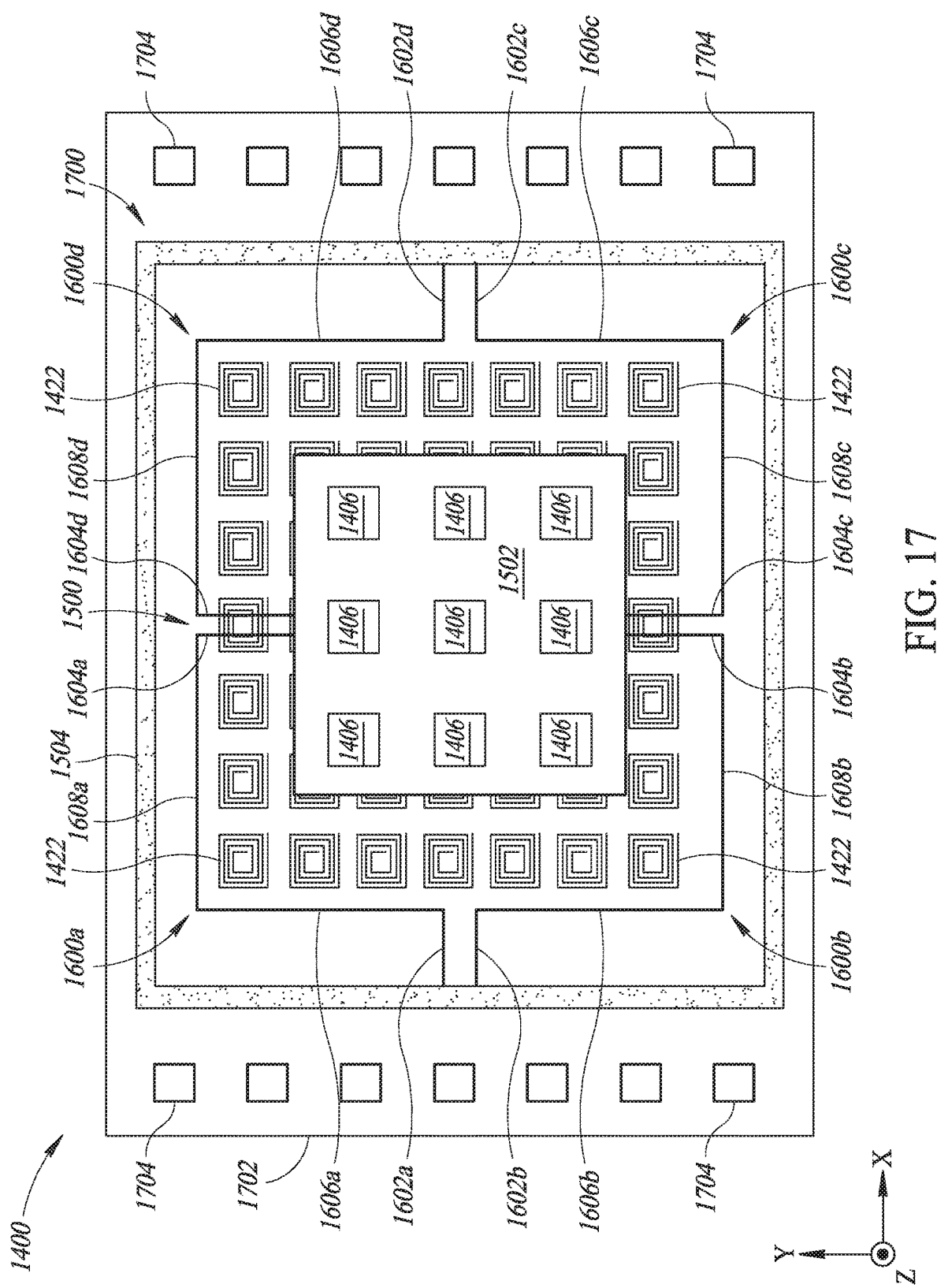
FIG. 17 is a more detailed top view of the combination EHS device of FIG. 16 showing in more detail permanent magnetic segments of the moveable mass and associated EHS coils for generation of electrical energy due to magnetic flux variation through the EHS coils in response to movement of the moveable mass according to an embodiment of the present disclosure.

FIG. 17 is a more detailed top view of one embodiment of the combination EHS device 1400 of FIG. 16 showing in more detail the permanent magnet segments 1406 arranged in the moveable mass 1502 and the arrangement of the EHS coils 1422 for generation of electrical energy due to magnetic flux variation through the EHS coils in response to movement of the moveable mass. The top view of FIG. 7 shows components contained within the internal cavity 1506 of a MEMS device 1700 corresponding to the MEMS device 602 of FIG. 6 with the top portion of the packaging structure 1504 removed to expose the internal cavity while a first semiconductor chip 1702 corresponds to the first semiconductor chip 604 of FIG. 6. Each of the MEMS device 1700 and chip 1702 of course includes additional components required to form the magnetic EHS device of the combination EHS device 1400. The embodiment of FIG. 17 illustrates the combination EHS device 1400 where the combination EHS device has a reverse electrowetting EHS device with a structure corresponding to the embodiments of FIGS. 6 and 7 and a magnetic EHS device portion having the structure illustrated in FIG. 17. Bonding pads 1704 are shown in FIG. 17 and correspond to the bonding pads 615 of FIG. 7.

The moveable mass 1502 is a plate having a square shape (other shapes are possible in other embodiments) and corresponds to the moveable mass 606 in FIG. 7 but further includes the permanent magnet segments 1406 arranged in a 3×3 array on the plate in example embodiment of FIG. 17. The shape and structure of the supporting structure 1500 depends on the shape of moveable mass 1502. In operation, when the moveable mass 1502 is subjected to an external force, bending or stretching of angles between the various portions 1606, 1608 and ends 1602, 1604 of the arms 1600a-d occurs based upon the direction and orientation of the external force applied to the moveable mass. The operation is the same as previously described for the corresponding structure of FIGS. 6 and 7 and accordingly will not again be described in detail with reference to FIG. 17. In addition, the operation of magnetic EHS devices having structures that can be used in forming the magnetic EHS device portion of the combination EHS device 1400 are described in detail in the previously incorporated U.S. Patent Application Publication No. 2017/0093265A1 and thus are not again described in detail herein.

Figure 18A:
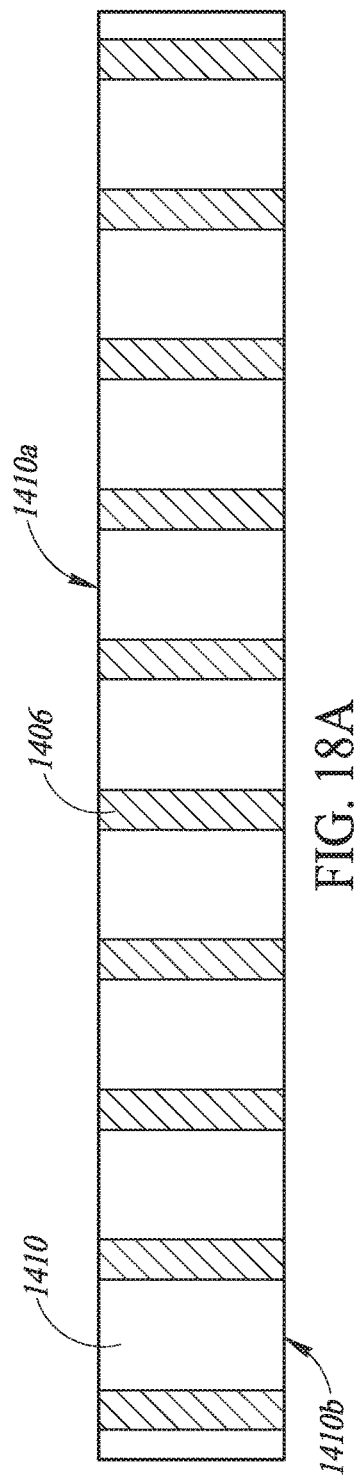
FIGS. 18$a$-18$c$ illustrate one embodiment of a process of forming the moveable mass of FIGS. 14-17 to include components for both the reverse electrowetting and magnetic EHS devices.
Figure 18B:
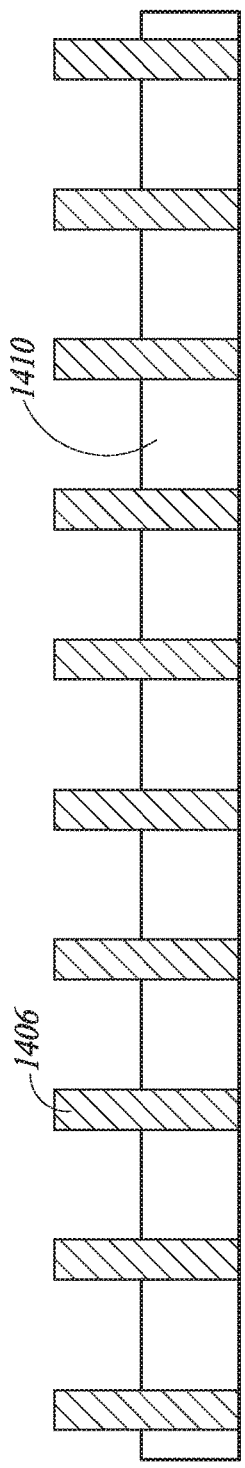
Figure 18C:
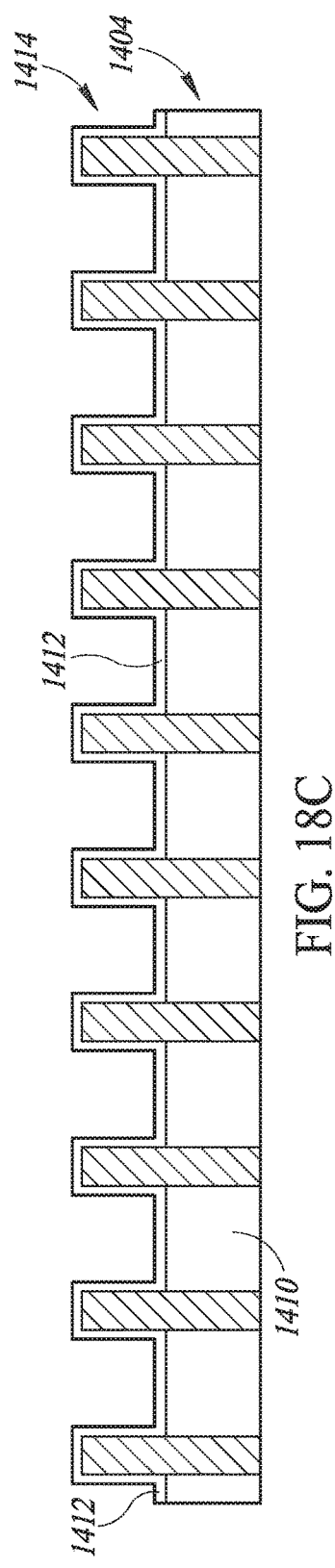

FIGS. 18a-18c illustrate one embodiment of a process of forming the moveable electrode 1404 of the moveable mass 1500 of FIGS. 14-17 to include components for both the reverse electrowetting and magnetic EHS devices. In FIG. 18A, the horizontal plate 1410 is illustrated and may include the support layer of the moveable mass 1502 where the support layer (see support layer 608 of the moveable mass 606 of FIG. 6) is formed from the same material as the support layer. The remaining description of FIGS. 18A-18C will simply refer to the horizontal plate 1410 to simply the description. Vias are formed through the horizontal plate 1410 through a suitable method such as photolithography and etching, laser drilling and so on. Each via extends through the horizontal plate 1410 from the surface 1410a to surface 1410b. The permanent magnet segments 1406 are then formed through a suitable process in the vias to form the structure shown in FIG. 18A.

As seen in FIG. 18B, portions of the horizontal plate 1410 from the surface 1410a are then removed to expose portions of the permanent magnet segments 1406 extending from the remaining portion of the horizontal plate. For example, the upper surface 1410a may be etched to form the structure of FIG. 18B. After the step illustrated in FIG. 18B, the dielectric layer 1412 is then formed over the portions of the permanent magnet segments 1406 extending above the remaining horizontal plate 1410 and over the remaining surface of the horizontal plate opposite the surface 1410b. In this way, the vertical projections 1414 of the moveable electrode 1404 are formed as illustrated in FIG. 18C.

The terms device and electrical component as used herein correspond to suitable circuitry to implement the associated functionality of the device or electrical component, where the suitable circuitry may include hardware, software, firmware, or any combination thereof. These terms and any similar terms utilized herein are not used herein as generic placeholders or nonce words for the term "means." Instead, the terms device and electrical component are used herein in combination with associated structural modifiers to cover the corresponding structures described herein as well as any corresponding structures known to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A harvesting and scavenging device, comprising:
  an inverse electrowetting harvesting and scavenging device including a first electrode and a second electrode that are moveable relative to one another in three-dimensions, a first insulating layer covering a surface of the second electrode that faces the first electrode, and a conductive fluid positioned between the first insulating layer and the first electrode, the second electrode having a plurality of segmented projection portions protruding toward the first electrode, each of the plurality of segmented projection portions including two L-shaped electrodes that are positioned laterally with respect to one another and separated by a second insulating layer;
  a magnetic energy harvesting and scavenging device including at least one permanent magnetic segment on the first electrode and at least one energy harvesting and scavenging coil positioned proximate the first electrode; and
  an energy harvesting and scavenging electrical component electrically coupled to the first electrode and the second electrode and coupled to the at least one energy harvesting and scavenging coil, the energy harvesting and scavenging electrical component configured to provide electrical energy generated through reverse electrowetting based on movement of the first electrode relative to the second electrode and the conductive fluid, and configured to provide electrical energy from the magnetic energy stored in the at least one energy harvesting and scavenging coil.

2. The harvesting and scavenging device of claim 1, wherein the inverse electrowetting harvesting and scavenging device comprises:
   a first substrate having a first surface and a second surface, the second electrode being proximate the first surface, wherein the first electrode extends over the first surface of the first substrate and is configured to be displaced relative to the first substrate in three dimensions responsive to an external force applied to the first electrode.

3. The harvesting and scavenging device of claim 2, wherein the energy harvesting and scavenging electrical component is formed in the first substrate.

4. The harvesting and scavenging device of claim 2, wherein the energy harvesting and scavenging electrical component is formed external to the first substrate and is electrically coupled to the first substrate.

5. The harvesting and scavenging device of claim 1, wherein the magnetic energy harvesting and scavenging device comprises:
   a plurality of permanent magnet segments on the first electrode, each of the plurality of permanent magnet segments generating a respective magnetic field; and
   a plurality of energy harvesting and scavenging coils in the first substrate, the plurality of energy harvesting and scavenging coils configured to store magnetic energy responsive to changes in magnetic fluxes of the respective magnetic fields of the plurality of permanent magnet segments through the plurality of energy harvesting and scavenging coils in response to movement of the first electrode.

6. The harvesting and scavenging device of claim 5, wherein each of the plurality of energy harvesting and scavenging coils is a spiral coil.

7. The harvesting and scavenging device of claim 5, wherein the first electrode includes a plurality of vertical projections extending into the conductive fluid, each vertical projection including a corresponding permanent magnet segment.

8. The harvesting and scavenging device of claim 6, wherein the segmented projection portions of the second electrode are interdigitated with the vertical projections of the first electrode.

9. The harvesting and scavenging device of claim 5 further comprising:
   a first substrate including a first surface, the plurality of energy harvesting and scavenging coils being in the first substrate proximate the first surface;
   a packaging structure coupled to the first surface of the first substrate and defining an internal cavity that houses the first electrode; and
   a supporting structure coupled between the packaging structure and the first electrode to moveably suspend the first electrode over the first surface within the internal cavity.

10. The harvesting and scavenging device of claim 9, wherein the supporting structure comprises a plurality of arms, each arm coupled between the packaging structure and the first electrode.

11. A harvesting and scavenging device, comprising:
   an inverse electrowetting harvesting and scavenging device including:
      a first substrate having a first surface and a second surface;
      a first electrode formed proximate the first surface, the first electrode including a first insulating layer covering a surface of the first electrode;
      an electromechanical systems device including a moveable mass that extends over the first surface of the first substrate and may be displaced relative to the first substrate in three dimensions responsive to an external force applied to the moveable mass;
      a second electrode formed on the moveable mass; and
      a conductive fluid positioned between the insulating layer covering the first electrode and the second electrode;
   a magnetic energy harvesting and scavenging device including:
      a plurality of permanent magnet segments on the moveable mass, each of the plurality of permanent magnet segments generating a magnetic field; and
      a plurality of energy harvesting and scavenging coils in the first substrate, the plurality of energy harvesting and scavenging coils configured to store magnetic energy responsive to changes in magnetic fluxes of the magnetic fields of the plurality of permanent magnet segments through the plurality of energy harvesting and scavenging coils due to movement of the moveable mass; and
   an energy harvesting and scavenging electrical component electrically coupled to the second electrode and the first electrode and coupled to the energy harvesting and scavenging coils, the energy harvesting and scavenging electrical component configured to provide electrical energy responsive to electrical energy generated by the second electrode, the conductive fluid and the electrode through reverse electrowetting due to movement of the second electrode relative to the first electrode and the conductive fluid and configured to provide electrical energy from the magnetic energy stored in the plurality of energy harvesting and scavenging coils,
   wherein the first electrode includes a plurality of segmented projection portions protruding toward the second electrode, each of the plurality of segmented projection portions including two L-shaped electrodes that are positioned laterally with respect to one another and separated by a second insulating layer.

12. The harvesting and scavenging device of claim 11, wherein the second electrode includes the plurality of permanent magnet segments.

13. The harvesting and scavenging device of claim 12, wherein the second electrode includes a plurality of vertical projections extending into the conductive fluid, each vertical projection including a corresponding permanent magnet segment and a third insulating layer covering the permanent magnet segment and positioned between the permanent magnet segment and the electrode.

14. The harvesting and scavenging device of claim 11 further comprising a packaging structure coupled to the first surface of the first substrate, the packaging structure defining an internal cavity between the packaging structure and the first surface and the second electrode being contained in the internal cavity.

15. The harvesting and scavenging device of claim 14 further comprising a supporting structure coupled between the packaging structure and the second electrode to moveably suspend the second electrode over the first surface within the internal cavity.

16. A harvesting and scavenging circuit, comprising:
   an inverse electrowetting harvesting and scavenging circuit including:
      a first substrate having a first surface and a second surface;

a first electrode over the first surface;

an electromechanical systems device including a moveable mass that extends over the first surface of the first substrate and may be displaced relative to the first substrate in three dimensions responsive to an external force applied to the moveable mass;

a second electrode formed on the moveable mass, the second electrode including a first insulating layer covering a surface of the second electrode; and a conductive fluid positioned between the first insulating layer and the first electrode;

a magnetic energy harvesting and scavenging circuit including:

at least one permanent magnet segment on the moveable mass, each of the at least one permanent magnet segments generating a magnetic field; and at least one energy harvesting and scavenging coil in the first substrate, the at least one energy harvesting and scavenging coil configured to store magnetic energy responsive to changes in magnetic flux of the respective magnetic fields of the at least one permanent magnet segment through the at least one energy harvesting and scavenging coil responsive to movement of the moveable mass; and energy harvesting and scavenging circuitry electrically coupled to the second electrode and the first electrode and coupled to the at least one energy harvesting and scavenging coil, the energy harvesting and scavenging circuitry configured to provide electrical energy responsive to electrical energy generated by the second electrode, the conductive fluid and the first electrode through reverse electrowetting responsive to movement of the second electrode relative to the first electrode and to the conductive fluid and to provide electrical energy from the magnetic energy stored in the at least one energy harvesting and scavenging coil, wherein the second electrode includes a plurality of segmented projection portions protruding toward the first electrode, each of the plurality of segmented projection portions including two L-shaped electrodes that are positioned laterally with respect to one another and separated by a second insulating layer.

17. The harvesting and scavenging circuit of claim 16, wherein the first electrode includes vertical projections, and the segmented projection portions of the second electrode are interdigitated with the vertical projections of the first electrode.

18. The harvesting and scavenging circuit of claim 17 further comprising a second insulating layer on the first electrode over the first surface.

19. The harvesting and scavenging circuit of claim 16, wherein the magnetic energy harvesting and scavenging circuit comprises a plurality of permanent magnet segments and a plurality of energy harvesting and scavenging coils.

20. The harvesting and scavenging circuit of claim 19, wherein the first substrate includes the plurality of energy harvesting and scavenging coils and the energy harvesting and scavenging circuitry.

* * * * *

UNITED STATES PATENT AND TRADEMARK OFFICE
CERTIFICATE OF CORRECTION

| | | |
|---|---|---|
| PATENT NO. | : 10,868,479 B2 | Page 1 of 1 |
| APPLICATION NO. | : 16/152087 | |
| DATED | : December 15, 2020 | |
| INVENTOR(S) | : Sara Loi | |

It is certified that error appears in the above-identified patent and that said Letters Patent is hereby corrected as shown below:

In the Claims

<u>Column 24, Line 32, Claim 11:</u>
"fluid and" should read, --fluid, and--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*